US012736686B2

(12) United States Patent
Burks, III et al.

(10) Patent No.: US 12,736,686 B2
(45) Date of Patent: Sep. 15, 2026

(54) ONBOARD GEOLOCATION FOR IMAGES

(71) Applicant: VANTOR INC., Westminster, CO (US)

(72) Inventors: Edward Calohill Burks, III, Wheat Ridge, CO (US); Peter Kevin Greene, Broomfield, CO (US); William Ryder Whitmire, Longmont, CO (US); Tyler Jacob Lanes, Broomfield, CO (US); Christopher John Schiavone, Golden, CO (US)

(73) Assignee: VANTOR INC., Westminster, CO (US)

(*) Notice: Subject to any disclaimer, the term of this patent is extended or adjusted under 35 U.S.C. 154(b) by 487 days.

(21) Appl. No.: 17/864,028

(22) Filed: Jul. 13, 2022

(65) Prior Publication Data

US 2024/0019588 A1 Jan. 18, 2024

(51) Int. Cl.
*G01S 19/48* (2010.01)
*G01S 19/05* (2010.01)
(Continued)

(52) U.S. Cl.
CPC ........... *G01S 19/485* (2020.05); *G01S 19/05* (2013.01); *G06T 7/74* (2017.01); *G06T 7/75* (2017.01);
(Continued)

(58) Field of Classification Search
CPC .......... B64G 1/244; B64G 1/36; B64G 1/361; B64G 1/242; B64G 1/369; B64G 1/66;
(Continued)

(56) References Cited

U.S. PATENT DOCUMENTS 4,688,091 A 8/1987 Kamel et al.
4,688,092 A 8/1987 Kamel et al.
(Continued)

FOREIGN PATENT DOCUMENTS

EP 0881554 A4 2/1998
EP 2951528 B1 7/2018

OTHER PUBLICATIONS

"How are satellite images mapped to terrain coordinates so precisely?", Internet; Jun. 1, 2019 (Jun. 1, 2019), XP002810292, Retrieved from the Internet: URL:https://gis.stackexchange.com/questions/310282/how-are-satellite-images-mapped-to-terrain-coordinates-so-precisely; [retrieved on Oct. 13, 2023].

*Primary Examiner* — Farhan Mahmud
(74) *Attorney, Agent, or Firm* — Harness, Dickey & Pierce, P.L.C.

(57) ABSTRACT

Onboard geolocation of target pixels in images captured by a spacecraft is disclosed. By performing the geolocation onboard the spacecraft considerable time is saved. The geolocation may be based on timestamped ephemeris data and timestamped attitude data of the spacecraft. In one aspect, initial geolocation data is refined based on a digital construct. In one aspect, the accuracy of the ephemeris data and/or the attitude data are improved based on refinements made to the initial geolocation data. For example, corrections may be made to attitude and/or orbit filter parameters based on the refinements made to the initial geolocation data. In one aspect, the accuracy of the attitude data and/or the ephemeris data may be improved by the use of state information. The state information may be determined at a ground computing station based on information not available to the spacecraft such as Ground Control Points and/or Star Control Points.

16 Claims, 12 Drawing Sheets

(51) Int. Cl.
*G06T 7/73* (2017.01)
*H04N 7/18* (2006.01)

(52) U.S. Cl.
CPC ... *H04N 7/183* (2013.01); *G06T 2207/10032* (2013.01)

(58) Field of Classification Search
CPC ........ B64G 3/00; B64G 1/245; B64G 1/2427; B64G 1/1021; B64G 1/366; B64G 1/28; B64G 1/1007; B64G 1/1078; B64G 1/646; B64U 2101/30; B64U 2201/10; B64U 20/87; B64U 2101/31; G06T 2207/10032; G06T 2207/30244; G06T 17/05; G06T 2207/30181; G06T 7/73; G06T 7/80; G06T 2207/30241
See application file for complete search history.

(56) References Cited

U.S. PATENT DOCUMENTS

| | | | | |
|---|---|---|---|---|
| 5,963,166 | A | 10/1999 | Kamel | |
| 6,023,291 | A | 2/2000 | Kamel et al. | |
| 8,301,377 | B2 | 10/2012 | Kamel et al. | |
| 9,947,128 | B2 | 4/2018 | Korb et al. | |
| 2008/0063270 | A1 | 3/2008 | McClelland et al. | |
| 2015/0211864 | A1* | 7/2015 | Carr | G01C 21/005<br>701/519 |

* cited by examiner

500

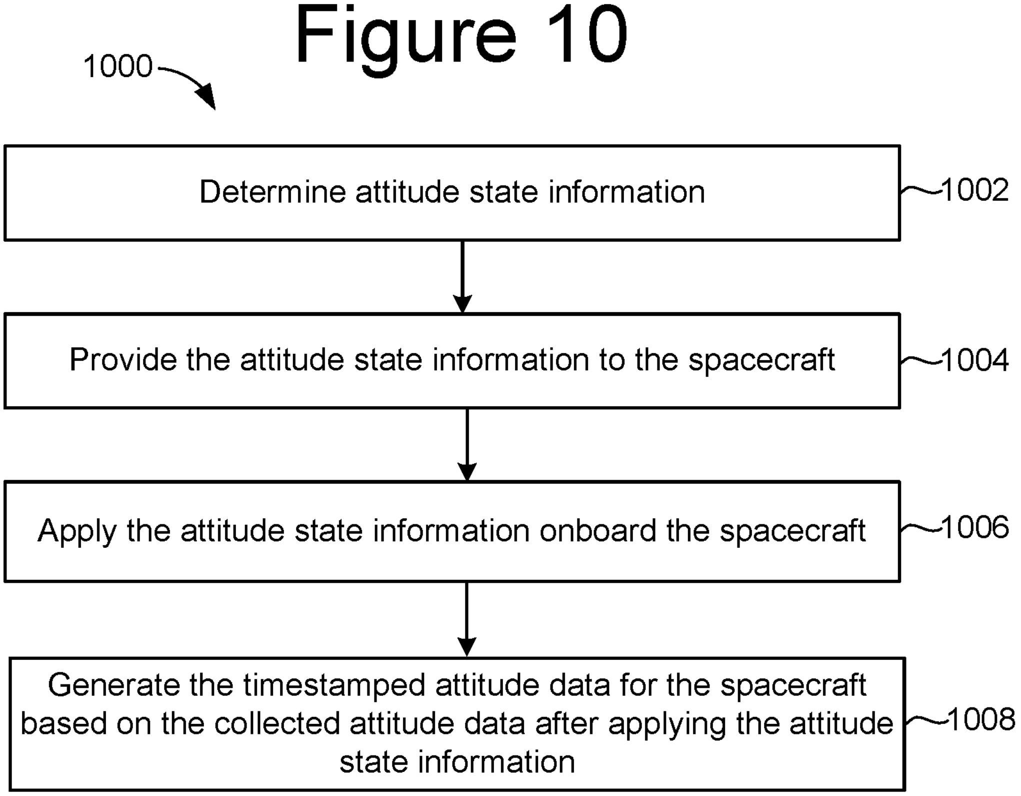

Figure 10
1000
Determine attitude state information
1002
Provide the attitude state information to the spacecraft
1004
Apply the attitude state information onboard the spacecraft
1006
Generate the timestamped attitude data for the spacecraft based on the collected attitude data after applying the attitude state information
1008

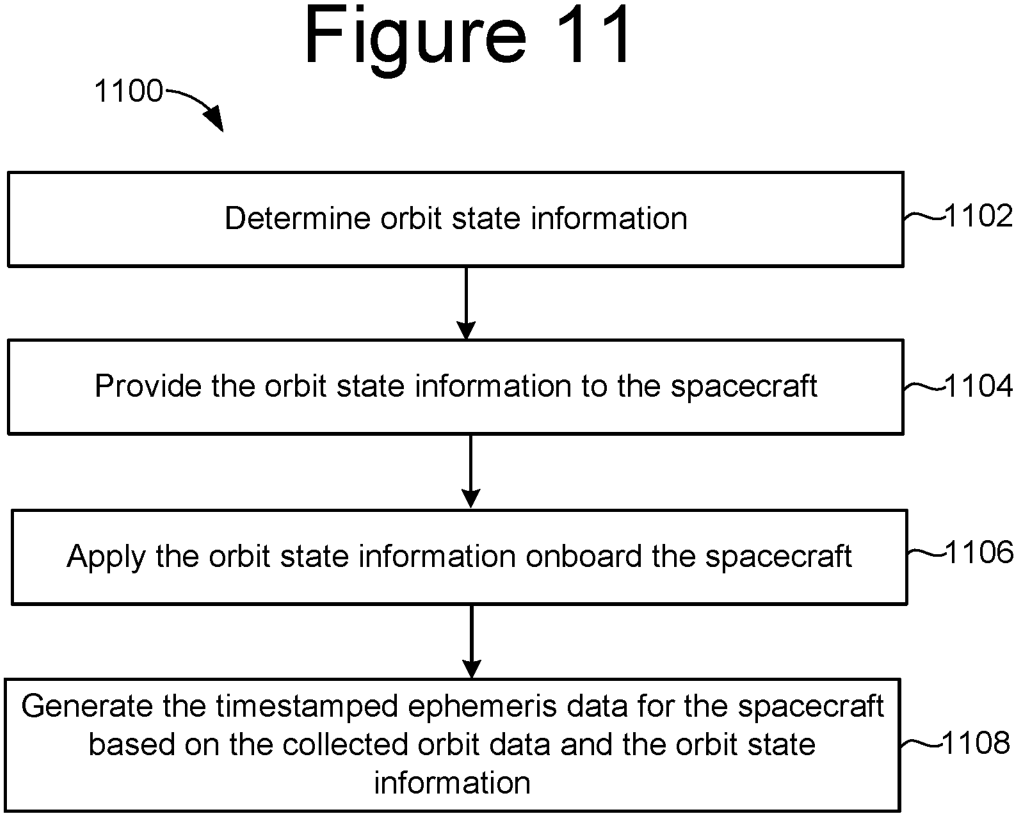

Figure 11
1100
Determine orbit state information
1102
Provide the orbit state information to the spacecraft
1104
Apply the orbit state information onboard the spacecraft
1106
Generate the timestamped ephemeris data for the spacecraft based on the collected orbit data and the orbit state information
1108

1302
Ground ADP State Information
212
Attitude Storage
222
Onboard Star Tracker 1 1304
Onboard Star Tracker 2 1306
Onboard Gyroscope 1308
Coarse Attitude Determination 1310
Attitude Smoother 1312
Geolocation Refinement Unit 312

ONBOARD GEOLOCATION FOR IMAGES

BACKGROUND

The use of satellite-based and aerial-based imagery is popular among government and commercial entities. To work with such images, it can be useful to precisely identify the location on the Earth that corresponds to a region (e.g., a set of one or more pixels) in the image. The term "geolocation" is used herein for the location on the Earth that corresponds to a region in the image. The geolocation could be specified in a number of different ways such as an Earth coordinate (e.g., longitude, latitude). Providing accurate geolocation data in a timely manner is important to customers. However, there are technical challenges in providing customers with accurate geolocation data for a set of images captured by a spacecraft in a timely manner.

BRIEF DESCRIPTION OF THE DRAWINGS

FIG. 10 is a flowchart of one embodiment of a process of determining the timestamped attitude information based at least in part on state information.

FIG. 11 is a flowchart of one embodiment of a process of determining the timestamped ephemeris information based at least in part on state information.

DETAILED DESCRIPTION

Figure 1A:
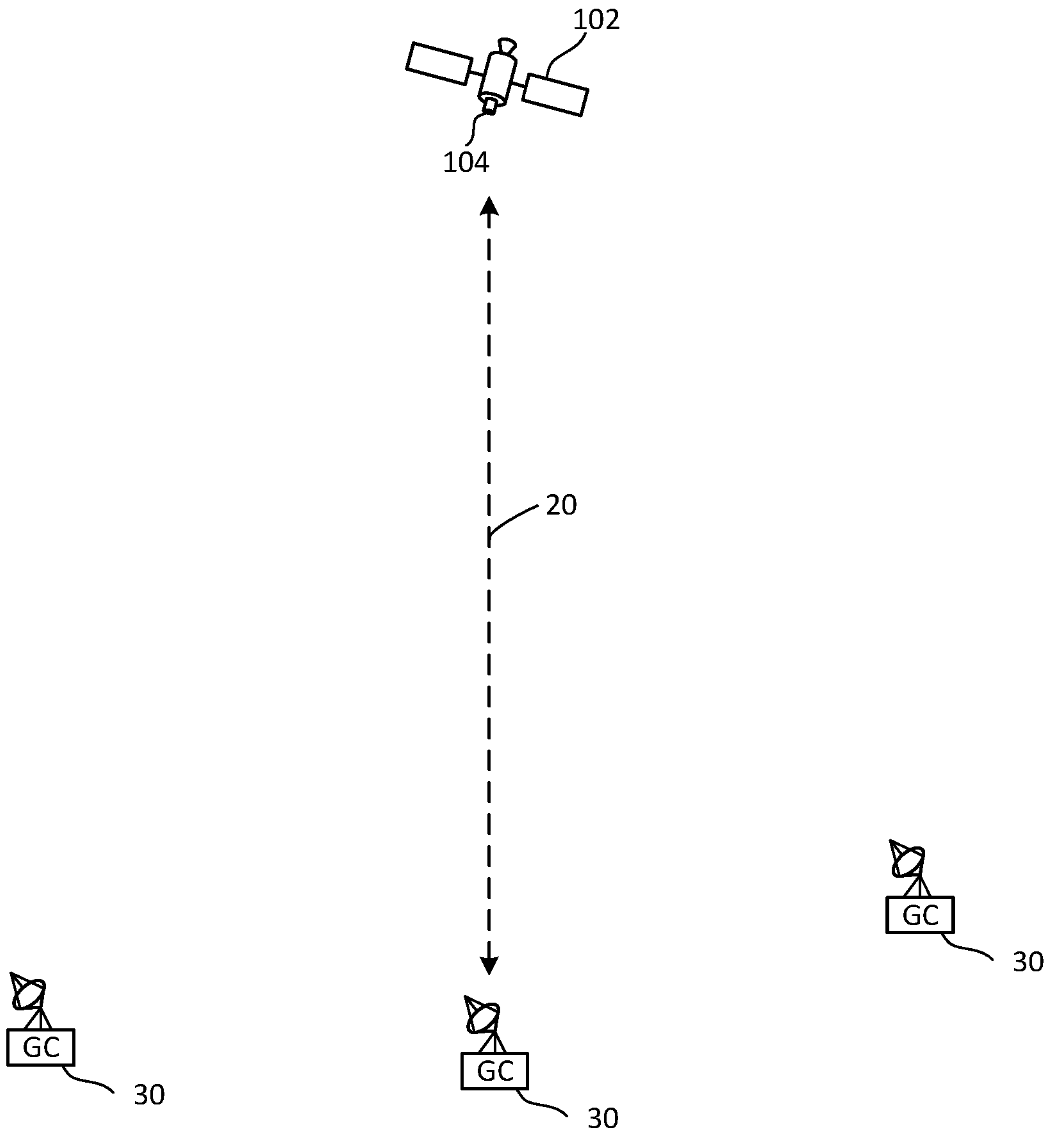
FIG. 1A is a block diagram of a spacecraft system.

Technology is disclosed herein for onboard geolocation of target elements (e.g., pixels) in images captured by a spacecraft. By onboard geolocation it is meant that the process of determining the geolocation of target elements in an image is performed onboard the spacecraft such as a satellite. By performing the geolocation onboard the spacecraft considerable time is saved. In some cases the spacecraft will determine the geolocation data for a set of images while the spacecraft is not able to transmit data to, for example, a ground station. This may be due to the spacecraft not being over a ground station. When the spacecraft is able to communicate with the ground station the geolocation data and the images may be transmitted from the spacecraft to the ground station. Thus, the geolocation data can be rapidly provided to customers.

There are technical challenges in generating accurate geolocation data on a spacecraft. One technical challenge is to provide the customer with their desired accuracy in the geolocation data. In one embodiment, generating the geolocation data is based on timestamped ephemeris data and timestamped attitude data of the spacecraft. In an embodiment, the timestamped ephemeris data and the timestamped attitude data are used to determine a "pixel ray", which is a ray from the image sensor that captured the image to the Earth. In an embodiment, the geolocation of the target elements is the intersection of the pixel ray with a digital elevation model (DEM) or the like. The accuracy of the geolocation data may therefore depend on the accuracy of the timestamped ephemeris data and/or the accuracy of the timestamped attitude data. Moreover, the accuracy of the geolocation data may depend on an accurate estimate of the orientation of the image sensor.

In one embodiment, the initial geolocation data, which is referred to herein as primary geolocation data, is refined to create secondary geolocation data. In one embodiment, the primary geolocation data is refined based on a digital construct (e.g., reference image). The digital construct may be of the same general area on the Earth that is contained in the image. In one embodiment, an electronic circuit on the spacecraft looks for a correspondence between the image and the digital construct. The electronic circuit may include a processor that executes processor executable instructions. Hence, hardware and/or software implementations are possible. The secondary geolocation data may be determined based on a degree of correspondence between the two. The primary geolocation data may then be refined based on the degree to which the two correspond.

In one embodiment, the accuracy of the timestamped ephemeris data and/or the accuracy of the timestamped attitude data are improved based on refinements made to the primary geolocation data. For example, corrections may be made to attitude filter parameters based on the refinements made to the primary geolocation data. Applying these corrected attitude filter parameters may improve the accuracy of the timestamped attitude data. In turn, the accuracy of the primary geolocation data that is generated based on the timestamped attitude data is improved. As another example, corrections may be made to orbit filter parameters based on the refinements made to the primary geolocation data. Applying these corrected orbit filter parameters may improve the accuracy of the timestamped ephemeris data. In turn, the accuracy of the primary geolocation data that is generated based on the timestamped ephemeris data is improved.

In one embodiment, the accuracy of the timestamped attitude data and/or the timestamped ephemeris data may be improved by the use of state information. In one embodiment, the state information is determined at a ground computing station and sent to the spacecraft on an occasional basis (e.g., every few hours, once a day, etc.). In an embodiment, the ground computing station is able to access information not available to the spacecraft such as Ground Control Points (GCPs) and/or Star Control Points (SCPs), which may be used in the determination of the state information. In one embodiment, the orbit state information is used to replace a current estimate onboard the spacecraft of at least a portion of an orbit state vector. In one embodiment, the orbit state information is used to replace a covariance of a current orbit state estimate onboard the spacecraft. Such replacements of estimates generated onboard the spacecraft can improve the accuracy of the timestamped ephemeris data, which in turn improves the accuracy of the primary geolocation data that is generated based on the timestamped ephemeris data. In one embodiment, the attitude state information is used to replace a current estimate onboard the spacecraft of at least a portion of an attitude state vector. In one embodiment, the attitude state information is used to replace a covariance of a current attitude state estimate onboard the spacecraft. Such replacements of estimates generated onboard the spacecraft can improve the accuracy of the timestamped attitude data, which in turn improves the accuracy of the primary geolocation data that is generated based on the timestamped attitude data.

FIG. 1A is a block diagram of a spacecraft system. The system of FIG. 1A includes spacecraft 102 and ground control terminals 30. In one embodiment, spacecraft 102 is a satellite; however, spacecraft 102 can be other types of spacecrafts than a satellite. Spacecraft 102 may be in a mission orbit, such as a geostationary or non-geostationary orbital location. The Spacecraft 102 may be in a Low Earth Orbit. Technology disclosed herein may be used for onboard geolocation of elements (e.g., pixels) in images captured by the spacecraft 102.

Spacecraft 102 has one or more image sensors 104. The image sensor(s) 104 generate image data, which is provided to an imaging system within the spacecraft 102. In one embodiment, the image sensor(s) 104 include an electro-optical imager. The image sensor(s) 104 may include a telescope and a focal plane. The focal plane contains a number of sensor elements. Each sensor element may output data that is indicative of light (or electromagnetic radiation) captured at that element. This output data may also indicate the time at which the light was collected. The image data could cover any of many different bands on the electromagnetic (EM) spectrum. The image sensors 104 could acquire data in, for example, the panchromatic and multispectral bands (e.g., coastal band (400-450 nm), blue band (450-510 nm), green band (510-580 nm), yellow band (585-625 nm), red band (630-690 nm), red edge band (705-745 nm), near-infrared 1 band (770-895 nm), and near-infrared 2 band (860-1040 nm)), as well as short-wave infrared (SWIR) and CAVIS imagery spectral bands. However, the image sensors 104 are not limited to these wavelengths of the EM spectrum.

The image sensors 104 may capture images of the Earth. In an embodiment, the images are in the visible spectrum, but are not limited thereto. For example, the images could include thermal images. In one embodiment, the sensors 104 include line sensors. Each line sensor may capture images that are thousands of pixels wide. In some embodiments, the line sensors are swept across the Earth's surface in "push broom" fashion. In some cases the attitude (angular position/orientation) of the satellite 102 may be adjusted to view different areas on the Earth's surface. The orbital motion of the satellite 102 is factored into the scan profile, which results in an image that covers the target area. However, the image sensors 104 are not limited to being line sensors or as being operated in a push broom manner.

The imaging system within the spacecraft 102 is able to determine a precise location on the Earth ("geolocation") for respective target elements within respective images collected by the image sensors 104. The spacecraft 102 may then send the images with the geolocation data to, for example, ground control terminal 30. In one embodiment, the spacecraft 102 sends target identifies (IDs) and geolocation. For example, the information sent from the spacecraft 102 could be Tree1 at Lat1Long1, Tree2 at Lat2Long2, Tank1 at Lat3Long3. Therefore, image processing at the ground control terminal 30 is greatly simplified. There may be times when the spacecraft 102 is not able to communicate with a ground control terminal 30 due to the present orbit position of the spacecraft 102. At such times, the spacecraft 102 may continue to determine the geolocation data, such that when the spacecraft 102 is able to communicate with a ground control terminal 30, the images and geolocation data are sent to the ground control terminal 30. Thus, the ground control terminal 30 need not take the time to determine the geolocation data. Thus, images and geolocation data may be immediately available for further processing and/or use.

Spacecraft 102 is able to communicatively couple by a wireless feeder link to ground control terminal 30, which is used to monitor and control operations of spacecraft 102. Three ground control terminals 30 are depicted in FIG. 1A. A presently operating communication link 20 is depicted to one of the ground control terminals 30. The spacecraft 102 does not presently have an operating communication link to the other two ground control terminals 30. Depending on the location of the spacecraft 102 it is possible that the spacecraft 102 may not have a downlink to any ground control terminal 30 at some point in time. In some cases, the spacecraft 102 could go, for example, 30 minutes to two hours without being able to transmit data to any ground control terminal 30. The spacecraft 102 is able to perform onboard geolocation of elements (e.g., pixels) in the images it collects during the time periods in which the spacecraft 102 is unable to download data to any ground control terminal 30. Therefore, when the spacecraft 102 is able to communicate with a ground control terminal 30 the spacecraft 102 can transmit the geolocation data and images. Thus, the geolocation data for the images can be rapidly provided to customers.

A spacecraft, which in some embodiments is a satellite, typically possesses a main body with North (N), South (S), East (E), and West (W) panels which are disposed between and orthogonal to an aft panel and a forward panel of the main body. Each panel is labeled according to the general direction toward which its normal vector is oriented when the satellite is on-orbit. The panels of the N, S, E, and W panels may, generically, also be referred to as side panels, sides, or surfaces. The aft and forward panels may, generically, also be referred to as aft and forward surfaces, respectively. For example, an on-orbit satellite is generally oriented such that normal vectors drawn from the N panel and the S panel are in substantial alignment with the N-S axis of the Earth, with the N panel facing North and the S panel facing South, and such that the normal vectors drawn from the E panel and the W panel are in substantial alignment with the E-W direction.

Figure 1B:
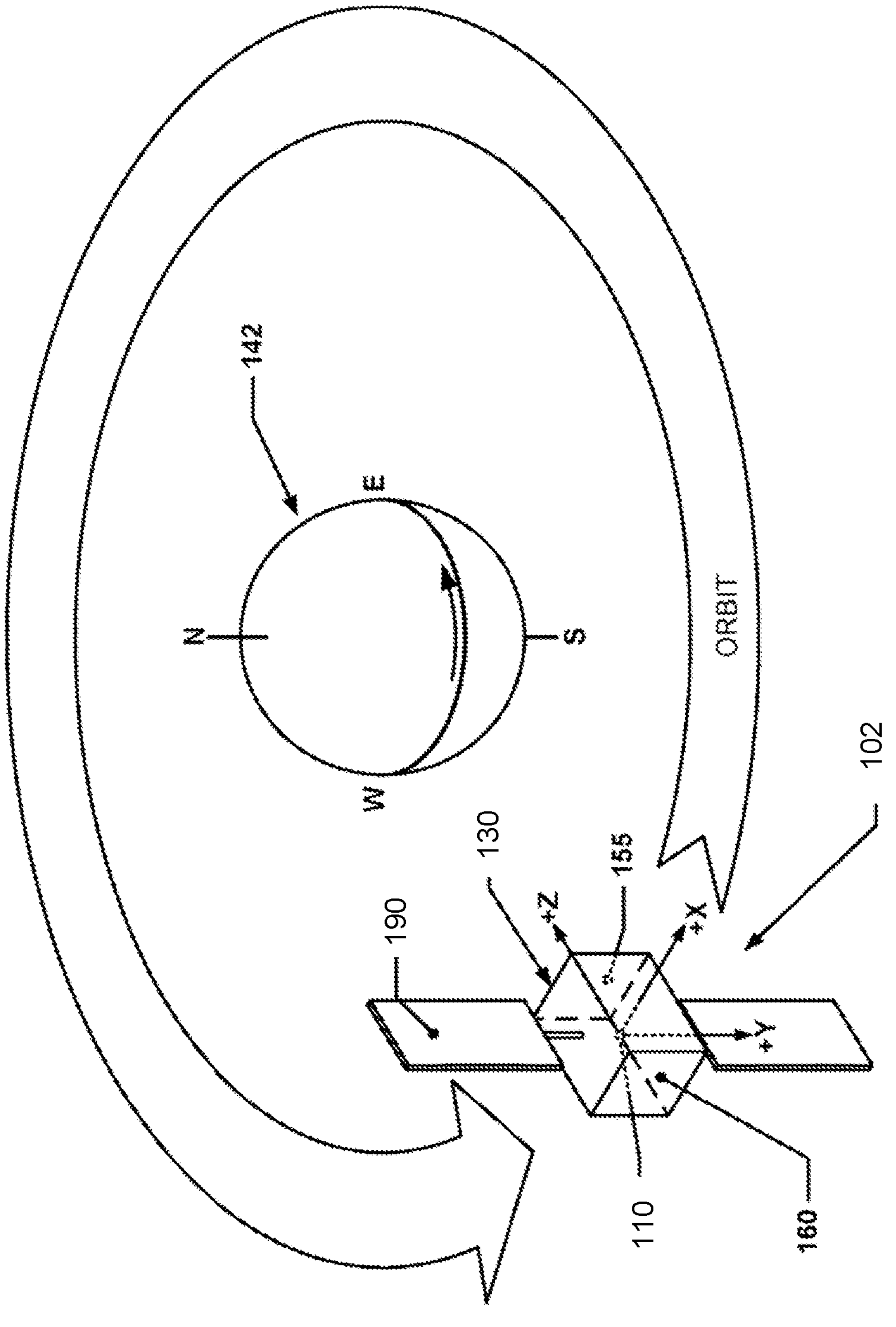
FIG. 1B depicts an Earth-pointing three axis stabilized satellite.

A better understanding of the reference frames used to describe satellites may be obtained by referring to FIG. 1B, wherein an Earth-pointing three axis stabilized satellite 102 is illustrated with respect to a reference spacecraft body coordinate frame 110 having roll (x), pitch (y), and yaw (z)

axes. Conventionally, the yaw axis is defined as being directed along a line intersecting Earth 142 center of mass and spacecraft 102 center of mass; the roll axis is defined as being perpendicular to the yaw axis, lying in the plane of the orbit in the direction of the spacecraft velocity vector; and the pitch axis (y), normal to the orbit plane, completes a three-axis, right-hand orthogonal system Satellite 102 has a main body 130 substantially in the form of a rectangular cuboid, in this example. Satellite 102 may include Earth deck 155 and anti-Earth deck 160. Conventionally, Earth deck 155 is orthogonal to the z axis and facing earthwards (or towards whatever body the satellite orbits); anti-Earth deck 160 is also orthogonal to the z axis, but facing away from the Earth. Earth deck 155 or anti-Earth deck 160 may have additional separately attached or integrated structures which extend away from either deck. A solar panel 190 is depicted.

In some embodiments, the orbit and attitude are determined onboard the spacecraft 102. Orbit determination is the process of determining the satellite's altitude, longitude, and latitude as a function of time. Longitude and latitude may be measured at the subsatellite point, i.e., the point where the Z axis intersects the earth's surface. The Z (yaw) axis connects the center of mass of the satellite with the center of mass of the earth. The Z axis lies in the orbital plane. The Y (pitch) axis passes through the center of mass of the satellite and is orthogonal to the orbital plane. The X (roll) axis is orthogonal to each of the Y and Z axes. The X axis lies along the transverse component of the satellite's velocity vector. The X axis would lie along the satellite's velocity vector if the orbit were perfectly circular. However, even for a satellite in geosynchronous orbit, the orbit is not precisely circular.

Attitude determination is the process of determining the orientation (roll, pitch, and yaw deviations) of a set of mutually orthogonal reference optical axes (x, y, z) relative to the reference orbital axes (X, Y, Z). In one embodiment, determination of the attitude includes a computation of the roll, pitch, and yaw angles of the reference axes x, y, z with respect to the reference orbital axes X, Y, Z, all with respect to time.

Figure 2:
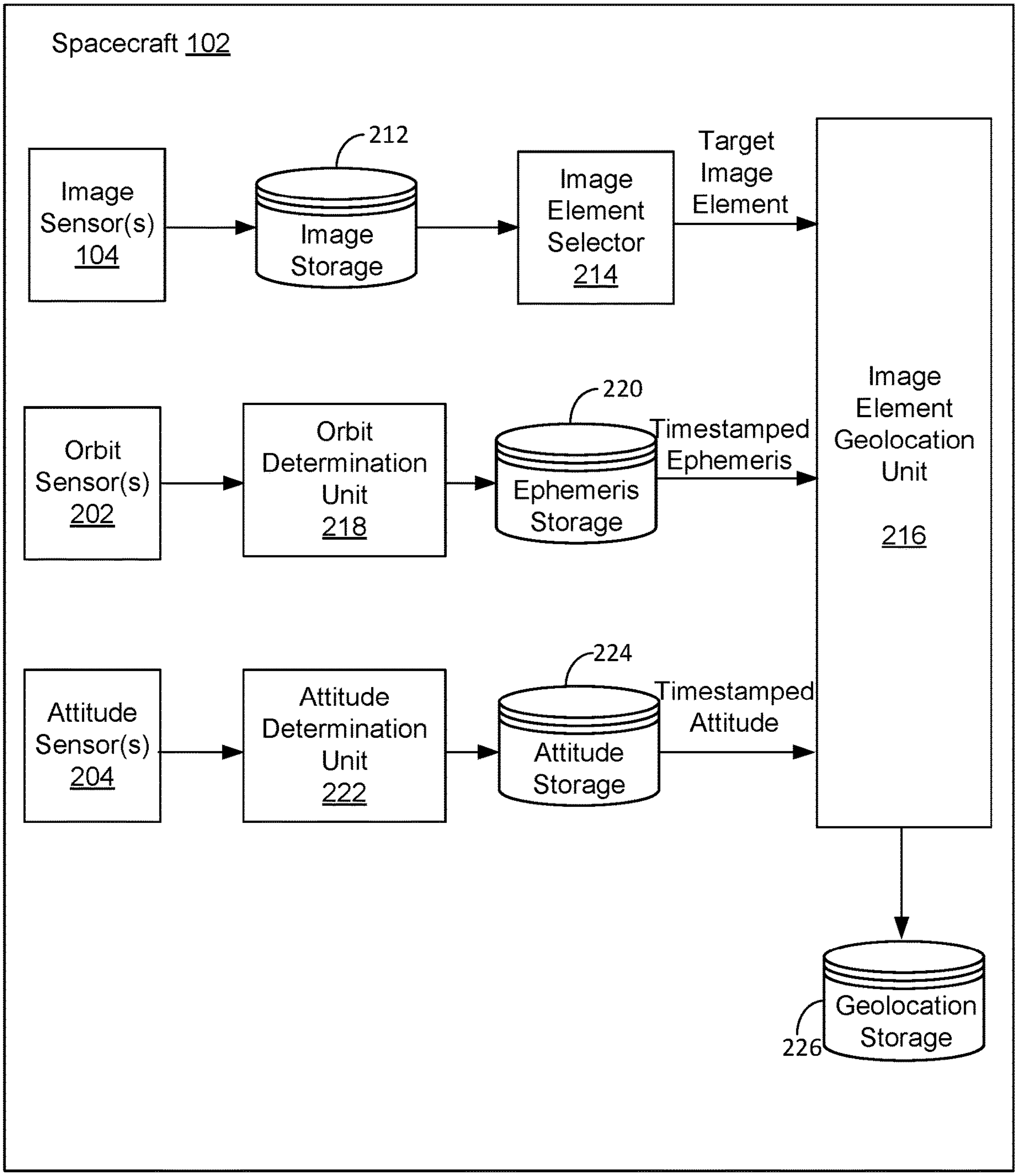
FIG. 2 depicts one embodiment of components on a spacecraft having an onboard image geolocation system.

FIG. 2 depicts one embodiment of components on a spacecraft 102 having an onboard image geolocation system. The components include image sensors 104, orbit sensor(s) 202, and attitude sensor(s) 204. The image sensors 104 have been discussed in connection with FIG. 1A. The orbit sensor(s) 202 are able to collect information about the position (e.g., location) of the spacecraft 102. The orbit sensor(s) 202 may include, but are not limited to, an onboard GPS (Global Positioning Satellite) receiver, which is able to communicate with one or more GPS satellites to obtain the present position of the spacecraft 102. The attitude sensor(s) 204 are able to collect information about the attitude of the spacecraft 102. The attitude sensor(s) 204 may include, but are not limited to, one or more onboard star trackers and/or an onboard gyroscope.

The image sensors 104 provide image data, which may be stored in the image storage 212. The image data may contain pixels and may be timestamped. The image element selector 214 is able to select a target element in an image from the sensors 104 for which geolocation is desired. The target element may include one or more pixels in the image. In one embodiment, the image element selector 214 selects a pixel or some set of pixels based on their location in the image. For example, pixels at the edge of the image or the center of the image may be selected for geolocation. In one embodiment, the image element selector 214 uses autonomous target recognition to identify a target element in the image for geolocation. The image element selector 214 informs the image element geolocation unit 216 of the target element (e.g., set of target pixels) that has been selected for geolocation.

The orbit determination unit 218 receives the position data from the orbit sensor(s) 202 and determines ephemeris data for the spacecraft. The ephemeris data may contain timestamped orbit positions of the spacecraft 102. The ephemeris data may be stored in ephemeris storage 220. The ephemeris data (or timestamped position) is provided to the image element geolocation unit 216. In one embodiment, the orbit determination unit 218 uses a Kalman filter to determine the ephemeris data for the spacecraft 102. A Kalman filter is one technique for estimating one or more states ("orbit state vector") of the spacecraft 102 pertaining to the orbit. However, other techniques may be used to estimate one or more states of the spacecraft 102 pertaining to the orbit.

The attitude determination unit 222 receives the attitude data from the attitude sensor(s) 204 and determines attitude data for the spacecraft. In one embodiment, the attitude determination unit 222 uses a Kalman filter to determine the attitude data for the spacecraft 102. A Kalman filter is one technique for estimating one or more states ("attitude state vector") of the spacecraft 102 pertaining to the attitude. However, other techniques may be used to estimate one or more states of the spacecraft 102 pertaining to the attitude. The attitude data may contain timestamped attitude data of the spacecraft 102. The attitude data may be stored in attitude storage 224. The attitude data (or timestamped attitude) is provided to the image element geolocation unit 216.

As noted, in some embodiments, a Kalman filter may be used to estimate the ephemeris and the attitude of the spacecraft 102. In general, a Kalman filter may be used to determine estimates of system state parameters, as well as uncertainties in the estimates. Moreover, a Kalman filter may be used to predict future system states based on past estimations. A Kalman filter may input one or more measurements and a measurement covariance matrix. In some embodiments, the sensors 202, 204 provide the one or more measurements. A Kalman filter may output an estimate of a state vector and a state covariance matrix. As will be discussed in more detail below, in some embodiments, the estimate of the state vector and/or the state covariance matrix are replaced based on state information that may be determined based on information not available to the spacecraft (e.g., GCPs, SCPs), which improves the accuracy of the timestamped ephemeris and/or timestamped attitude data.

The image element geolocation unit 216 determines a geolocation for the target image element based on the timestamped ephemeris data and the timestamped attitude data. The geolocation data for the target image element is stored in geolocation storage 226. The geolocation data for a given target image element may identify the target image element and may contain a timestamp. The geolocation data and the associated images may be sent to, for example, a ground control terminal 30. The geolocation data and the associated images may alternatively be sent to another spacecraft. The other spacecraft could transmit the geolocation data and images to a ground control terminal 30. As will be discussed more fully below, the geolocation data may be refined onboard the spacecraft 102, by which it is meant the geolocation data is made more accurate. The refined geolocation data may be used to improve the accuracy of the timestamped attitude and/or the timestamped ephemeris. The refined geolocation data is referred to herein as "secondary geolocation data." As will be discussed in more detail below, in some embodiments, the estimate of at least a portion of the state vector and/or the state covariance matrix are replaced based on corrected filter parameters that may be determined based on refinements made onboard to the geolocation data, which improves the accuracy of the timestamped ephemeris and/or timestamped attitude data.

In one embodiment, the image element selector 214, the orbit determination unit 218, the attitude determination unit 222, and the image element geolocation unit 216 are implemented in software. In a software implementation, the spacecraft 102 has one or more processors that execute processor executable instructions. The processor executable instructions may be stored in processor readable storage, which is tangible storage such as volatile memory or non-volatile memory. The processor readable storage may include, but is not limited to, random access memory (RAM), static RAM, dynamic RAM, read only memory (ROM), erasable programmable ROM (EPROM), electrically erasable programmable ROM (EEPROM), flash memory, optical storage, magnetic storage, or any other tangible medium that may be used to store and maintain information for access by a processor. In one embodiment, all or a portion of the image element selector 214, the orbit determination unit 218, the attitude determination unit 222, and/or the image element geolocation unit 216 are implemented in hardware. For example, all or a portion of the image element selector 214, the orbit determination unit 218, the attitude determination unit 222, and/or the image element geolocation unit 216 may be implemented by an ASIC, FPGA, etc.

The image storage 212, the ephemeris storage 220, the attitude storage 224, and the geolocation storage 226 may be implemented by processor readable storage, which is tangible storage such as volatile memory or non-volatile memory. Although depicted as separate storage units in FIG. 2 for the purpose of discussion, the image storage 212, the ephemeris storage 220, the attitude storage 224, and the geolocation storage 226 may be implemented in the same physical storage device.

Figure 3:
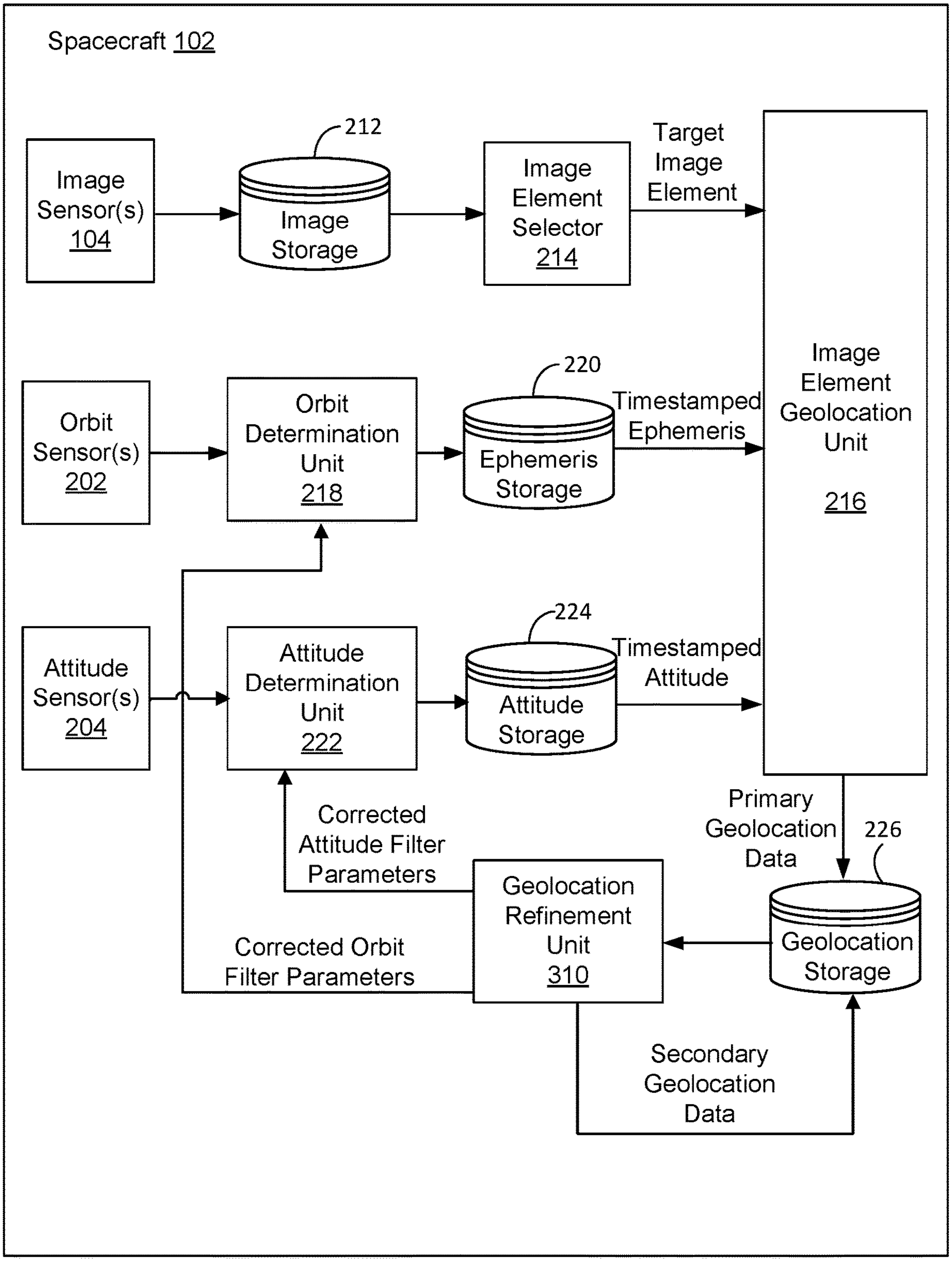
FIG. 3 is another embodiment of a spacecraft having on onboard image geolocation system that refines geolocation data to improve the estimated attitude data and/or the ephemeris.

FIG. 3 is another embodiment of a spacecraft 102 having on onboard image geolocation system. The onboard image geolocation system is similar to the system shown and described with respect to FIG. 2, but adds a geolocation refinement unit 310. The geolocation refinement unit 310 accesses the primary geolocation data from the geolocation storage 226 (or directly from the image element geolocation unit 216) and refines that primary geolocation data. The initial geolocation data that is generated by the image element geolocation unit 216 is referred to herein as "primary geolocation data" and the geolocation data that is generated by the geolocation refinement unit 310 is referred to herein as "secondary geolocation data."

In one embodiment, the geolocation refinement unit 310 accesses a digital construct (e.g., one or more reference images) and uses a sensor-construct matching algorithm or the like to generate the secondary geolocation data. The digital construct may be of the same general area on the Earth that is contained in the image. The primary geolocation data for the image may be used to determine what digital construct should be used. The digital construct may be two-dimensional or three-dimensional. The geolocation refinement unit 310 may match the image with the digital construct to determine a correspondence between the two. In one embodiment, the geolocation refinement unit 310 looks for a correspondence between the image and the digital construct. The primary geolocation data may then be refined based on the degree to which the two correspond. The secondary geolocation data may be stored into the geolocation storage 226. At some point, the secondary geolocation data may be sent to a ground control terminal 30, with the images and optionally the primary geolocation data. As an alternative, the secondary geolocation data could be sent to another spacecraft. The other spacecraft could transmit the secondary geolocation data to a ground control terminal 30.

In an embodiment, geolocation refinement unit 310 corrects attitude filter parameters based on the refinements made to the primary geolocation data. In an embodiment, these attitude filter parameters pertain to a Kalman filter. In an embodiment, the attitude filter parameters include a state vector for a Kalman filter of the attitude determination unit 222. The state vector is the vector of all attitude states being estimated by the Kalman filter. In an embodiment, the attitude filter parameters include a covariance matrix for a Kalman filter of the attitude determination unit 222. This covariance matrix is the covariance of the attitude states being estimated by the Kalman filter. The corrected attitude filter parameters are sent to the attitude determination unit 222. In an embodiment, the attitude determination unit 222 uses the corrected attitude filter parameters to improve the accuracy of the attitude data. For example, the attitude determination unit 222 may replace a current estimate of an attitude vector based on the corrected attitude filter parameters. As another example, the attitude determination unit 222 may replace at least a portion of a current covariance matrix based on the corrected attitude filter parameters. Therefore, the timestamped attitude data may be improved.

In an embodiment, geolocation refinement unit corrects orbit filter parameters based on the refinements made to the primary geolocation data. In an embodiment, these orbit filter parameters pertain to a Kalman filter. In an embodiment, the orbit filter parameters include a state vector for a Kalman filter of the orbit determination unit 218. The state vector is the vector of all orbit states being estimated by the Kalman filter. In an embodiment, the orbit filter parameters include a covariance matrix for a Kalman filter of the orbit determination unit 218. This covariance matrix is the covariance of the orbit states being estimated by the Kalman filter. The corrected orbit filter parameters are sent to the orbit determination unit 218. In an embodiment, the orbit determination unit 218 uses the corrected orbit filter parameters to improve the accuracy of the ephemeris data. For example, the orbit determination unit 218 may replace a current estimate of an orbit vector based on the corrected orbit filter parameters. As another example, the orbit determination unit 218 may replace at least a portion of a current covariance matrix based on the corrected orbit filter parameters. Therefore, the timestamped ephemeris data may be improved.

Figure 4:
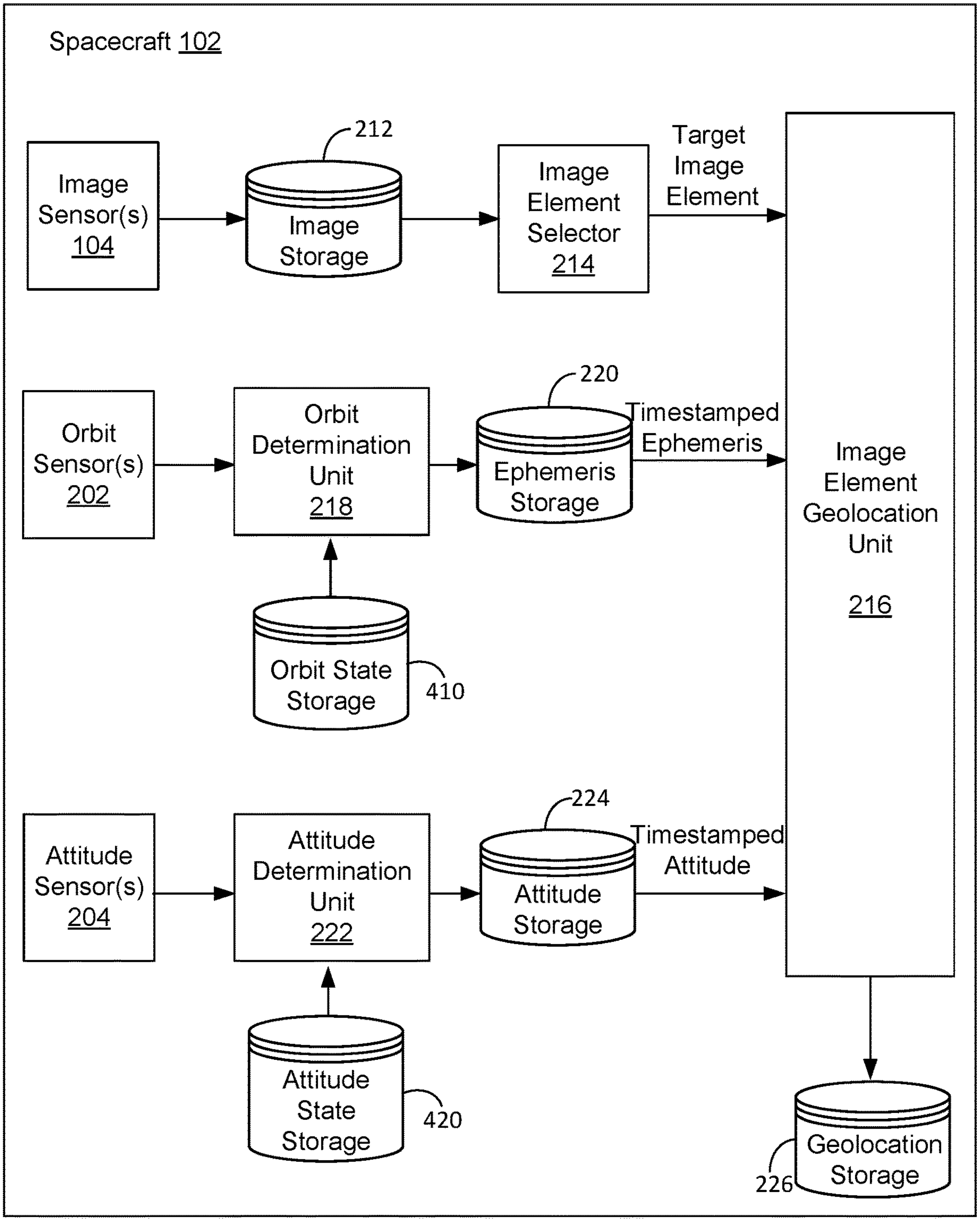
FIG. 4 is another embodiment of a spacecraft having on onboard image geolocation system that uses state information to improve the estimated attitude data and/or the ephemeris.

In one embodiment, the accuracy of the timestamped attitude data and/or the timestamped ephemeris data may be improved by the use of state information. In an embodiment, the state information is determined based on information that is not available to the spacecraft 102, such as GCPs or SCPs. FIG. 4 is another embodiment of a spacecraft 102 having on onboard image geolocation system. The system is similar to the system shown and described with respect to FIG. 2, but adds orbit state information 410 and attitude state information 420. The orbit state information 410 can be used to improve the determination of the orbit position of the spacecraft 102. The attitude state information 420 can be used to improve the determination of the attitude of the spacecraft 102. The orbit state information 410 and the attitude state information 420 may be determined ahead of time. In one embodiment, a ground control terminal determines the orbit state information 410 and the attitude state information 420 and sends the state information to the spacecraft. In an embodiment, the ground control terminal runs a similar state determination algorithm as is run by the spacecraft but has access to information that is not available to the spacecraft 102, such as GCPs or SCPs. Thus, the ground control terminal may be able to determine and provide state information that can be used to improve the accuracy of the onboard attitude and/or orbit determination. The state information 410, 420 may be sent on an occasional basis, such as about every six hours, about every 24 hours, or some other unit of time. Different portions of the state information could be updated at different intervals. Note that the improvements made by the use of the uploaded state information may persist for a considerable length of time.

In an embodiment, the attitude determination unit 222 uses the attitude state information 420 to improve the accuracy of the attitude data. Therefore, the timestamped attitude data may be improved. In an embodiment, the orbit determination unit 218 uses the orbit state information 410 to improve the accuracy of the ephemeris data. Therefore, the timestamped ephemeris data may be improved.

Figure 5:
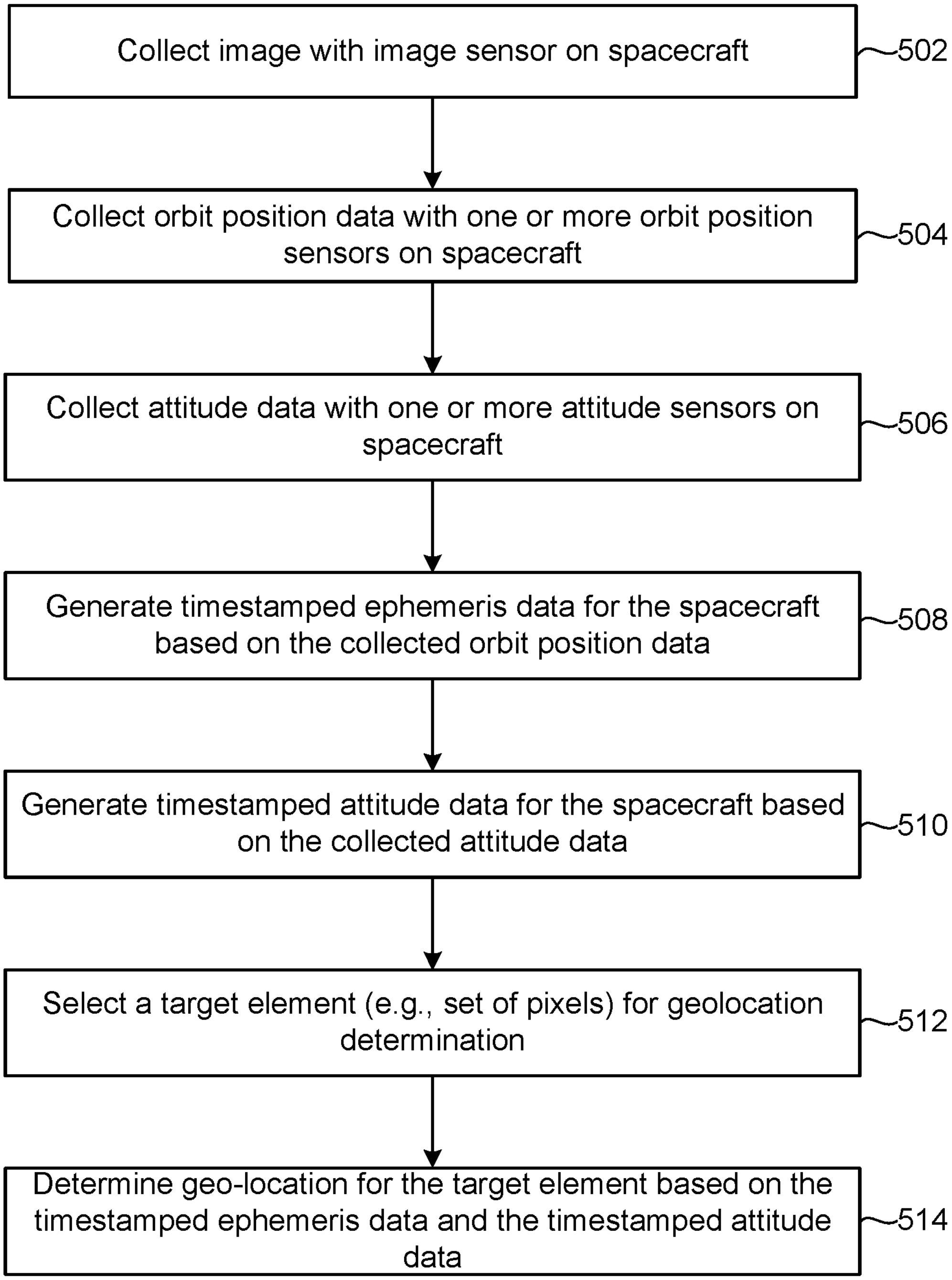
FIG. 5 is a flowchart of one embodiment of a process of on-board geolocation of images.

FIG. 5 is a flowchart of one embodiment of a process 500 of on-board geolocation of target elements in images. The process 500 is performed onboard the spacecraft 102. Process 500 is discussed with respect to one image. The process 500 may be performed for many images collected by the spacecraft 102.

Step 502 includes sensing an image with an image sensor 104 of the spacecraft 102. The image is data that may contains pixels and may be timestamped. This "image data" may be stored in image storage 212.

Step 504 includes collecting orbit position data with one or more orbit sensors 202 on the spacecraft 102. In one embodiment, an onboard GPS receiver receives GPS location data from one or more GPS satellites. This GPS location data indicates the location of the spacecraft 102.

Step 506 includes collecting attitude data with one or more attitude sensors 204 on the spacecraft 102. In one embodiment, one or more star trackers determine the orientation of the spacecraft 102 with respect to certain stars. In one embodiment, an onboard gyroscope collects data pertinent to the attitude of the spacecraft 102.

Step 508 includes generating timestamped ephemeris data for the spacecraft 102 based on the collected orbit position data. Thus, timestamped ephemeris data is based on the data collected by the onboard orbit sensor(s) 202. In one embodiment, timestamped ephemeris data is determined after the orbit determination unit 218 applies corrected orbit filter parameters from the geolocation refinement unit 310. In one embodiment, timestamped ephemeris data is determined after the orbit determination unit 218 applies orbit state information, which may be provided from a ground control terminal 30.

Step 510 includes generating timestamped attitude data for the spacecraft 102 based on the collected attitude data. Thus, the timestamped attitude data is based on the data collected by the onboard attitude sensor(s) 204. In one embodiment, timestamped attitude data is determined after the attitude determination unit 222 applies corrected attitude filter parameters from the geolocation refinement unit 310. In one embodiment, the timestamped attitude data is determined after the attitude determination unit 222 applies attitude state information, which may be provided from a ground control terminal 30.

Step 512 includes selecting a target element (e.g., set of pixels) in the image for geolocation determination. In one embodiment, a pre-determined region of the image is selected as the target element. For example, the center of the image may be selected as the target pixel(s). The center could be specified by a grid of pixels. As another example, a boundary of image may be selected as the target pixel(s). For example, the pixels that define one or more corners or one or more edges of the image may be selected. Hence, the target pixel(s) may be selected without regard to the content in the image. In one embodiment, the target pixel(s) are selected based on the content in the image. For example, autonomous target recognition may be used to locate a feature in the image. The autonomous target recognition may be used to select pixels in the image that meet a set of criteria. For example, the set of criteria may be that the pixels correspond to water, clouds, trees, automobiles, etc.

Step 514 includes determining a geolocation for the target pixel(s). In one embodiment, the geolocation for the target pixel(s) of the image and the image itself are sent to a ground control terminal 30. In one embodiment, the geolocation for the target pixel(s) of the image is refined onboard the spacecraft 102. Then, the refined geolocation may be used to improve the accuracy of the attitude data and/or the ephemeris data.

Figure 6:
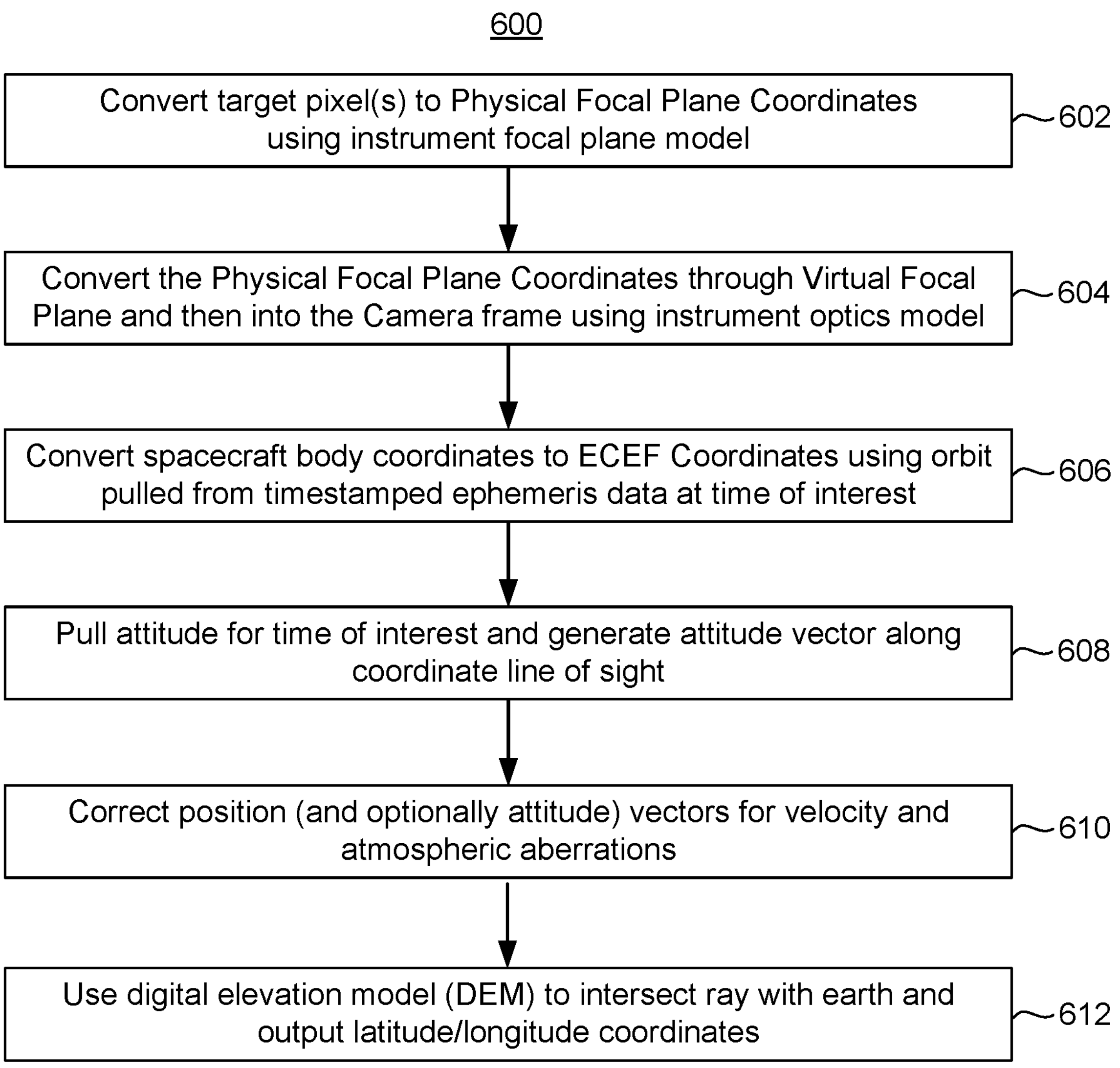
FIG. 6 is a flowchart providing further details of one embodiment of a process of determining geolocation data for a target image element of an image.

In one embodiment, step 514 includes performing an image space to camera space transformation. This transformation may be used to map the target pixels in the image to a target sensor element of the image sensor 104. For example, the target pixels in the image may be mapped to a focal plane of the image sensor based on a camera model. Then, a ray ("pixel ray") from the target sensor element to the Earth is determined based on the attitude and the ephemeris. A digital elevation model (DEM) may be used to determine where the ray intersects the Earth to determine the geolocation for the target pixel(s) in the image. FIG. 6 provides further details of one embodiment of step 514.

FIG. 6 is a flowchart providing further details of one embodiment of a process 600 of determining geolocation data for a target pixel(s) of an image. The process 600 is performed onboard the spacecraft 102. The process 600 is performed in one embodiment of step 514 of process 500. In one embodiment, process 600 includes performing an image space to camera space transformation.

Step 602 includes converting the target pixel(s) to physical focal plane coordinates using an instrument focal plane model. The target image element may be selected in step 512 of process 500. The image may be accessed from the image database onboard the spacecraft 102 or, alternatively, accessed directly from the image sensor 104. As noted above, the image is timestamped.

Step 604 includes converting the physical focal plane coordinates through the virtual focal plane and then into the camera frame using an instrument optics model.

Step 606 includes converting spacecraft body coordinates to ECEF (Earth Centered Earth Fixed) coordinates using the timestamped ephemeris data at a time of interest. The timestamped ephemeris data may be accessed from the ephemeris storage 220 onboard the spacecraft 102.

Step 608 includes pulling the attitude for the time of interest and generating an attitude vector along a coordinate line of sight. The timestamped attitude data may be accessed from the attitude storage 224 onboard the spacecraft 102.

Step 610 includes correcting the position (and optionally attitude) vectors for velocity and atmospheric aberrations. One embodiment of step 610 results in ECEF coordinates that represent the sensor element origin and an attitude vector that represents a ray (e.g., "pixel ray").

Step 612 includes using a digital elevation model (DEM) to intersect the pixel ray with the Earth. The result of this intersection may include latitude/longitude coordinates. The latitude/longitude coordinates are included in one embodiment of geolocation data for the target sensor element. Note that latitude/longitude coordinates are one example for the geolocation data.

Figure 7A:
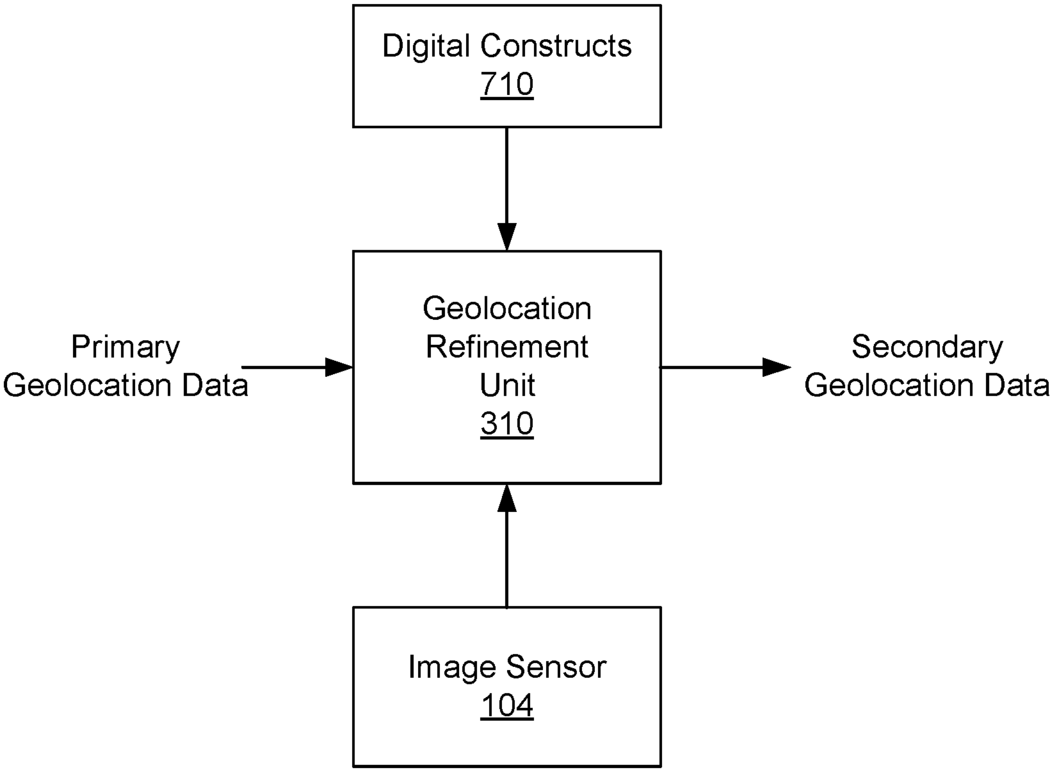
FIG. 7A is a diagram that provides further details of one embodiment of refining geolocation data

FIG. 7A is a diagram that provides further details of one embodiment of refining geolocation data. The geolocation refinement unit 310 receives primary geolocation and generates secondary geolocation, which is a refined version of the primary geolocation. The geolocation refinement unit 310 has access to images by the image sensor 104. Alternatively, the geolocation refinement unit 310 may access images from the image storage 212. The geolocation refinement unit 310 has access to digital constructs 710. The digital constructs 710 may be stored in processor readable storage onboard the spacecraft 102. In one embodiment, digital constructs 710 include reference images of some portion of the Earth. A digital construct may be two-dimensional or three-dimensional FIG. 7A will be discussed with respect to the flowchart in FIG. 7B.

Figure 7B:
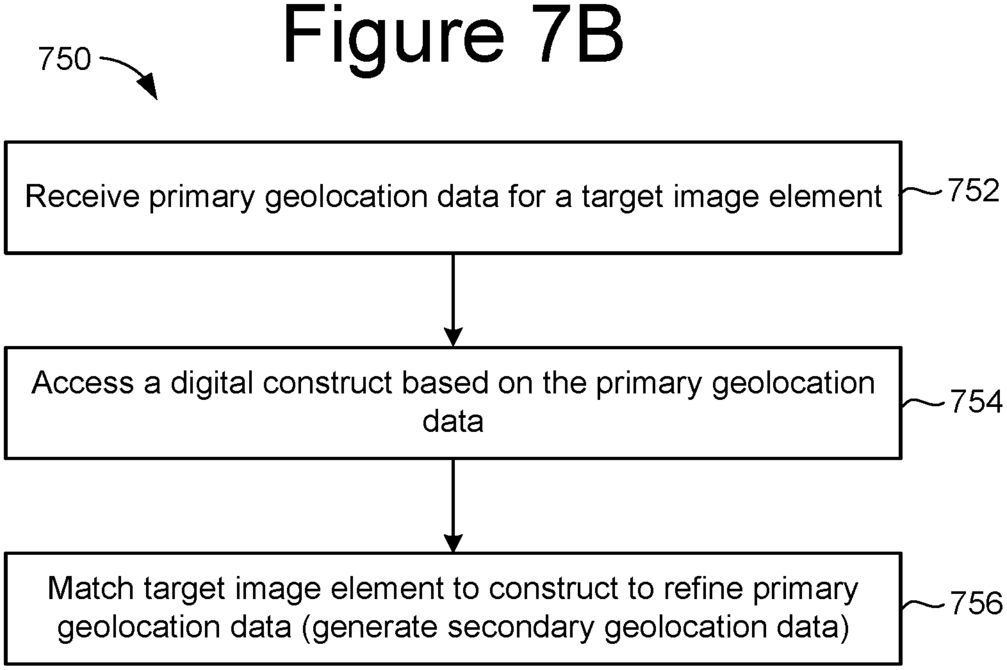
FIG. 7B is a flowchart of one embodiment of a process of refining geolocation data.

FIG. 7B is a flowchart of one embodiment of a process 750 of refining primary geolocation data. The process 750 is performed onboard the spacecraft 102. This process 750 may be performed based a number of images that were collected by the image sensor 104 of the spacecraft 102. Step 752 includes receiving primary geolocation data for a target image element. Step 754 includes accessing a digital construct based on the primary geolocation data for the target image element. For example, geolocation data for the target image element may include longitude/latitude. A digital construct that covers that longitude/latitude may be selected. For example, the digital construct could be reference image of a region at that longitude/latitude. Step 756 includes matching the target image element to the digital construct to refine the primary geolocation data. In one embodiment, the geolocation refinement unit 310 may match the target image element with the digital construct to determine a correspondence between the two. In one embodiment, the geolocation refinement unit 310 looks for a correspondence between the target image element and a corresponding region in the digital construct. The primary geolocation data may then be refined based on the degree to which the two correspond. Step 756 results in secondary geolocation data.

Figure 8:
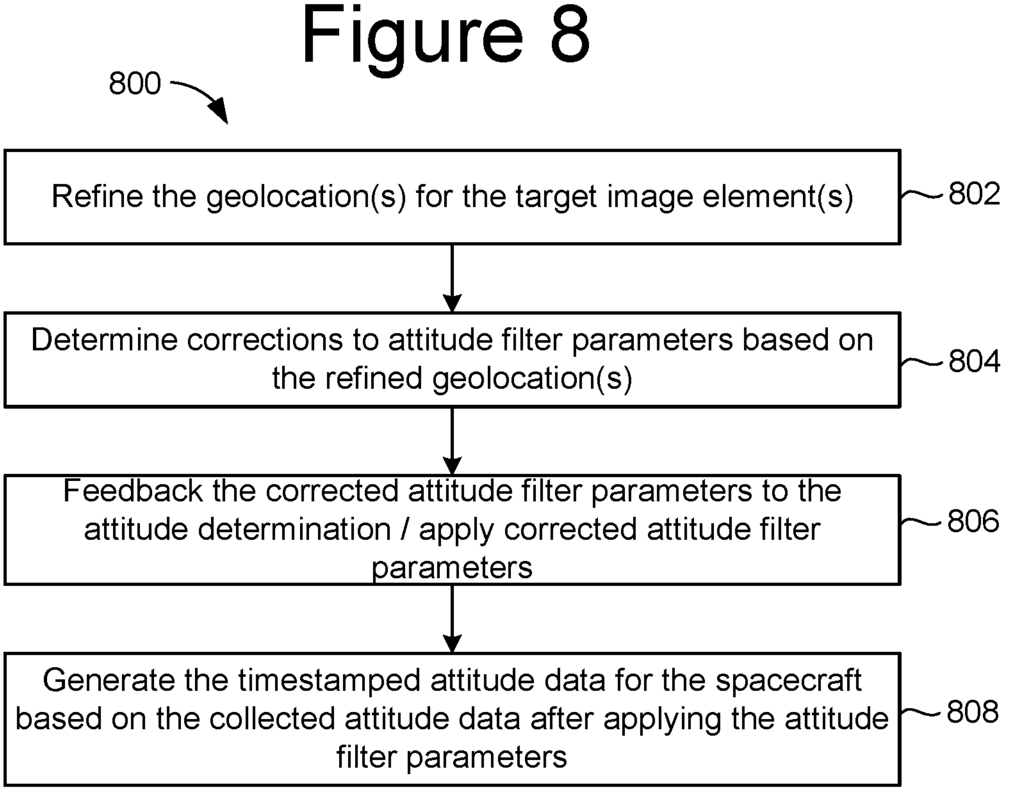
FIG. 8 is a flowchart of one embodiment of a process of using refined geolocation data to improve the estimated attitude data.

In one embodiment, the accuracy of the timestamped attitude data is improved based on refining the primary geolocation data. FIG. 8 is a flowchart of one embodiment of a process 800 of improving the accuracy of the attitude data based on refining the primary geolocation data. The process 800 is performed onboard the spacecraft 102. This process 800 may be performed based a number of images that were collected by the spacecraft 102.

Step 802 includes refining the geolocations for respective target image elements. In one embodiment, for a given image, step 802 includes comparing the image with a digital construct (e.g., reference image). Process 750 may be used in an embodiment of step 802.

Step 804 includes determining corrections to attitude filter parameters based on refining the primary geolocation data. In an embodiment, the attitude filter parameters are associated with a Kalman filter or the like that is used to estimate an attitude state vector. In one embodiment, an attitude state vector for a Kalman filter used by the attitude determination unit 222 is determined in step 804. In one embodiment, a covariance matrix for a Kalman filter used by the attitude determination unit 222 is determined in step 804.

Step 806 includes feeding back the corrected attitude filter parameters to the attitude determination unit 222. Step 806 also includes applying the corrected attitude filter parameters. In one embodiment, the attitude determination unit 222 uses the corrected attitude state vector in order to improve the estimates of the attitude. For example, the corrected attitude state vector may be used to replace at least a portion of a current attitude state vector estimated by a Kalman filter in the attitude determination unit 222. In one embodiment, the attitude determination unit 222 uses the corrected attitude covariance matrix in order to improve the estimates of the attitude. For example, the corrected attitude state covariance matrix may be used to replace at least a portion of a current covariance matrix estimated by a Kalman filter in the attitude determination unit 222.

Step 808 includes the attitude determination unit 222 determining timestamped attitude data using the attitude data collected from the one or more attitude sensors 204 after applying the corrected attitude filter parameters. Step 808 is performed in one embodiment of step 510 of process 500. Therefore, the timestamped attitude data may be improved by use of the attitude filter parameters that were fed back. Therefore, the next set of primary geolocation data may be improved. For example, the improved timestamped attitude may be used to determine data geolocation data for images as described in, for example, process 500.

Figure 9:
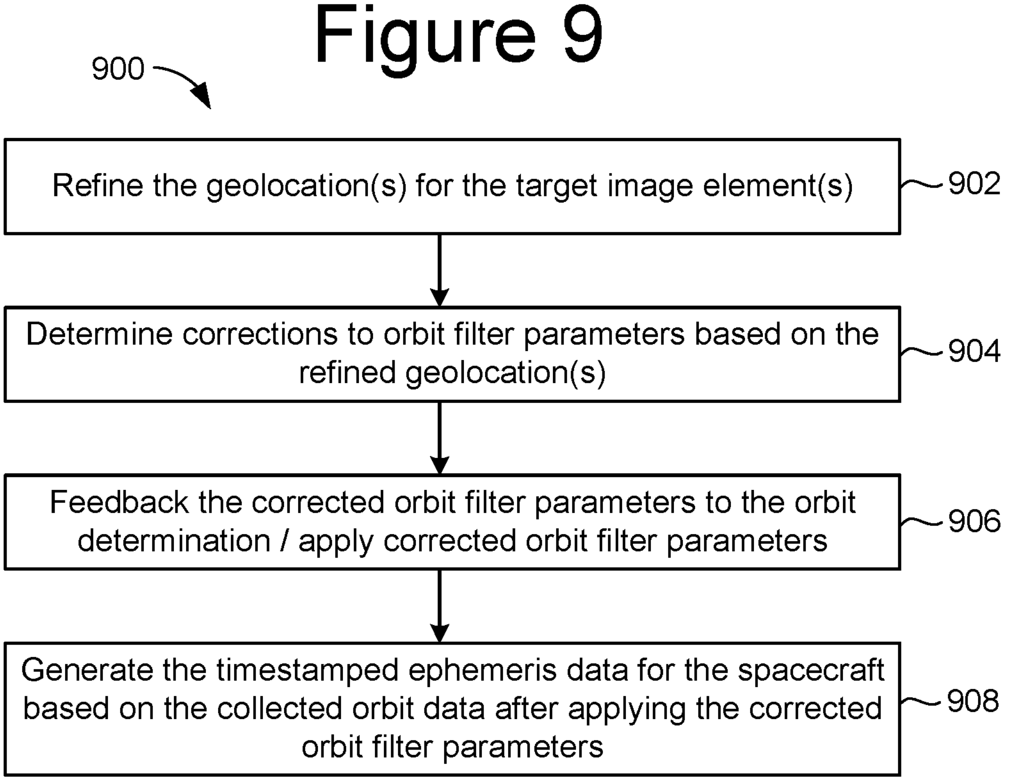
FIG. 9 is a flowchart of one embodiment of a process of using refined geolocation data to improve the estimated ephemeris data.

In one embodiment, the accuracy of the timestamped ephemeris data is improved based on refining the primary geolocation data. FIG. 9 is a flowchart of one embodiment of a process 900 of using refined geolocation data to improve the ephemeris data. The process 900 is performed onboard the spacecraft 102. This process 900 may be performed based a number of images that were collected by the spacecraft 102.

Step 902 includes refining the geolocations for respective target image elements. In one embodiment, for a respective image, step 902 includes comparing the image with a digital construct (e.g., reference image). Process 750 may be used in an embodiment of step 902.

Step 904 includes determining corrections to orbit filter parameters based on the refined geolocation data. In an embodiment, the orbit filter parameters are associated with a Kalman filter or the like that is used to estimate an orbit state vector. In one embodiment, a state vector for a Kalman filter used by the orbit determination unit 218 is determined. In one embodiment, a covariance matrix for a Kalman filter used by the orbit determination unit 218 is determined.

Step 906 includes feeding back the corrected orbit filter parameters to the orbit determination unit 218. Step 906 also includes applying the corrected orbit filter parameters. In one embodiment, the orbit determination unit 218 uses the corrected orbit vector in order to improve the estimates of the ephemeris. For example, the corrected orbit state vector may be used to replace at least a portion of a current orbit state vector estimated by a Kalman filter in the orbit determination unit 218. In one embodiment, the orbit determination unit 218 uses the corrected orbit covariance matrix in order to improve the estimates of the ephemeris. For example, the corrected orbit state covariance matrix may be used to replace at least a portion of a current covariance matrix estimated by a Kalman filter in the orbit determination unit 218.

Step 908 includes the orbit determination unit 218 determining timestamped ephemeris data using the attitude data collected from the one or more orbit sensors 202 after applying the corrected orbit filter parameters. Step 908 is performed in one embodiment of step 508 of process 500. Therefore, the timestamped ephemeris data may be improved by use of the orbit filter parameters that were fed back. Therefore, the next set of primary geolocation data may be improved. For example, the improved timestamped ephemeris may be used to determine data geolocation data for images as described in, for example, process 500.

In one embodiment, processes 800 and 900 are combined in order to improve both the timestamped ephemeris data and the timestamped attitude data. However, it is not required to use process 800 and 900 together.

In one embodiment, the timestamped attitude information is determined at least in part on state information. Using the state information to determine the timestamped attitude information may improve the accuracy of the timestamped attitude information. Thus, the accuracy of the primary geolocation data may be improved. FIG. 10 is a flowchart of one embodiment of a process 1000 of determining the timestamped attitude information based at least in part on state information. Step 1002 includes determining the attitude state information. In one embodiment, the attitude state information is determined external to the spacecraft 102, such as at a ground control terminal 30 or the like. The attitude state information may include state information for correcting gyro errors and state information for correcting star tracker errors. Gyro states may include, but are not limited to rate bias, symmetric and asymmetric scale factors, and sense-axis alignments. Star tracker states may include, but are not limited to optical distortion, chromatic aberration, catalog bias, and alignment. Furthermore, the attitude state information may include a prediction of attitude estimate. The attitude state information may be used to correct errors in the sensor measurements such that the attitude can as accurate as possible.

In one embodiment of step 1002 a ground station runs a Kalman filter that is the same Kalman filter that is run by the attitude determination unit 222 of the spacecraft 102. However, in an embodiment, the ground station will have access to Ground Control Points (GCPs) and/or Star Control Points (SCPs) that might not be available to the spacecraft 102. Ground Control Points are locations on the earth that can be autonomously detected in imagery and have been surveyed so their true position is known to within a few centimeters. Some examples are street corners or the edges of buildings. Star Control Points are stars whose positions are known from a star catalog. In an embodiment, the ground station is able to derive measurements of the spacecraft's telescope camera frame attitude at a given point in time (since the true position of the control point is known from a survey or star catalog). In an embodiment, the GCPs and/or the SCPs may be used to adjustment the attitude state vector and/or the covariance. For example, the GCPs and/or the SCPs may be used in an update step of a Kalman filter. For example, the ground-based Kalman filter may adjust all of the attitude states and covariances based on the Kalman filter state/covariance update equations. Therefore, the ground station is able to obtain excellent observability into the sensor alignments and other states.

Step 1004 includes providing the attitude state information to the spacecraft 102. In one embodiment, ground control terminal 30 sends the attitude state information to the spacecraft 102. The attitude state information may be stored in attitude state storage 420 in an embodiment, the attitude state information is only sent to the spacecraft 102 occasionally. For example, the attitude state information could be sent a few times a day, once a day, once every few days, etc. Thus, the attitude state information may stay relevant for a significant time interval.

Step 1006 includes applying the attitude state information onboard the spacecraft 102. In one embodiment, the attitude state information includes an attitude state vector (that may have been determined at a ground station), which may be used to replace a current attitude state vector estimated by the attitude determination unit 222 onboard the spacecraft 102. In one embodiment, the attitude state information includes a covariance matrix (that may have been determined at a ground station), which may be used to replace at least a portion of a current covariance matrix generated by the attitude determination unit 222 onboard the spacecraft 102. The current covariance matrix generated by the attitude determination unit 222 onboard the spacecraft 102 refers to a covariance of the attitude states that are being estimated by the attitude determination unit 222. In an embodiment, the aforementioned attitude state vector and covariance matrix are associated with a Kalman filter.

Step 1008 includes generating the timestamped attitude data for the spacecraft 102 based on the collected attitude data from the one or more attitude sensors 204 after applying the attitude state information onboard the spacecraft 102. Note that the improvements in accuracy after applying the attitude state information onboard the spacecraft 102 may persist for a substantial period of time. Hence, the attitude state information need not be applied continuously. Also, in some cases, previously unobservable states are able to be tracked for a period of time after applying the attitude state information. As one example, the alignment of the attitude sensors with respect to the telescope camera frame can be tracked more accurately after applying the attitude state information. Therefore, the accuracy of the primary geolocation data may be improved. In some embodiments, the inclusion of the GCPs and/or the SCPs in the determination of the attitude state information helps to improve the ability to track the alignment of the attitude sensors with respect to the telescope camera frame. Step 1008 is performed in one embodiment of step 510 of process 500. Step 1008 is performed on the spacecraft 102. Afterwards, the timestamped attitude data may be used by the image element geolocation unit 216 on the spacecraft 102 to determine geolocation data for images as described in, for example, process 500.

In one embodiment, the timestamped ephemeris information is determined at least in part on state information. Using the state information to determine the timestamped ephemeris information may improve the accuracy of the timestamped ephemeris information. Thus, the accuracy of the primary geolocation data may be improved. FIG. 11 is a flowchart of one embodiment of a process 1100 of determining the timestamped ephemeris information based at least in part on state information. Step 1102 includes determining the orbit state information. In one embodiment, the orbit state information is determined external to the spacecraft 102, such as at a ground control terminal 30 or the like. The orbit filter states may include, but are not limited to, spacecraft position and velocity, a solar scale parameter to account for variations in solar radiation pressure experienced by the spacecraft, an atmospheric drag parameter to similarly model variations/error in the atmospheric drag model, a bias term for the spacecraft clock, and three terms for empirical accelerations on the spacecraft for any additional unmodeled forces. In one embodiment, a nominal satellite initial state (position and velocity) estimate which could be a single point or time series for the spacecraft 102 is provided as an initial condition for a Kalman filter on the spacecraft 102. Other information that can be include in the orbit state information include estimates of the GPS satellites orbit and clocks, earth orientation parameters, and antenna calibration and offset information.

In one embodiment of step 1102 a ground station runs a Kalman filter that is the same Kalman filter that is nm by the orbit determination unit 218 of the spacecraft 102. However, in an embodiment, the ground station will have access to Ground Control Points (GCPs) and/or Star Control Points (SCPs). In an embodiment, the GCPs and/or the SCPs may be used to make adjustments to the orbit state vector and/or the covariance. For example, the GCPs and/or the SCPs may be used in an update step of a Kalman filter. For example, the ground-based Kalman filter may adjust all of the orbit states and covariances based on the Kalman filter state/covariance update equations. Therefore, the ground station is able to obtain excellent observability into the sensor alignments and other states.

Step 1104 includes providing the ephemeris state information to the spacecraft 102. In one embodiment, ground control terminal 30 sends the ephemeris state information to the spacecraft 102. The ephemeris state information may be stored in orbit state storage 410. In an embodiment, the ephemeris state information is only sent to the spacecraft 102 occasionally. For example, the ephemeris state information could be sent a few times a day, once a day, once every few days, etc. Thus, the ephemeris state information may stay relevant for a significant time interval.

Step 1106 includes applying the orbit state information onboard the spacecraft 102. In one embodiment, the orbit state information includes an orbit state vector (that may have been determined at a ground station), which may be used to replace at least a portion of a current orbit state vector being estimated by the orbit determination unit 218 onboard the spacecraft 102. In one embodiment, the orbit state information includes an orbit covariance matrix (that may have been determined at a ground station), which may be used to replace at least a portion of a current covariance matrix generated by the orbit determination unit 218 onboard the spacecraft 102. The current orbit covariance matrix generated by the orbit determination unit 218 onboard the spacecraft 102 refers to a covariance of the orbit states that are being estimated by the orbit determination unit 218. In an embodiment, the aforementioned orbit state vector and orbit covariance matrix are associated with a Kalman filter.

Step 1108 includes generating the timestamped ephemeris data for the spacecraft 102 based on the collected ephemeris data from the one or more orbit sensors 202 after applying the orbit state information onboard the spacecraft 102. Step 1108 performed in one embodiment of step 508 of process 500. Step 1108 is performed on the spacecraft 102. Afterwards, the timestamped attitude data may be used by the image element geolocation unit 216 on the spacecraft 102 to determine geolocation data for images as described in, for example, process 500.

In one embodiment, both process 1000 and 1100 are used. Thus, both the timestamped attitude data and the timestamped ephemeris data may be improved with state information. However, state information may be used to determined only one of the timestamped attitude data and the timestamped ephemeris data.

In one embodiment, the timestamped attitude data is determined after applying both the state information and the refined attitude filter parameters. Thus, process 800 and process 1000 may be used together. In one embodiment, the timestamped ephemeris data is determined after applying both the state information and the refined orbit filter parameters. Thus, process 900 and process 1100 may be used together. In general, any combination of processes 800, 900, 1000, and/or 1100 may be used together.

Figure 12:
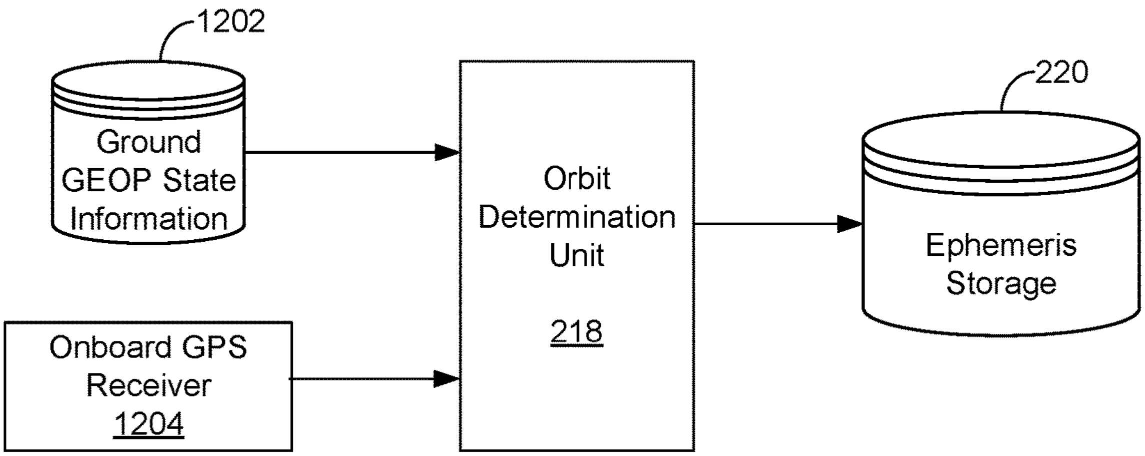
FIG. 12 is a diagram depicting further details of one embodiment of components for determining timestamped ephemeris data.

FIG. 12 is a diagram depicting further details of one embodiment of components for determining timestamped ephemeris data. The onboard GPS receiver 1204 is able to receive GPS location data from a GPS satellite. This GPS location data indicates the location of the spacecraft 102. The onboard GPS receiver 1204 is one embodiment of orbit sensor(s) 202. The onboard GPS receiver 1204 may also receive additional information, including but not limited to, pseudo-ranges and carrier phases of each satellite constellation that the onboard GPS receiver 1204 is tracking. The onboard GPS receiver 1204 provides the GPS location data to the orbit determination unit 218 via an onboard communication link. The GPS location data may be provided to the orbit determination unit 218 in real time.

The Ground GEOP State Information 1202 is one embodiment of orbit state information. The Ground GEOP State Information 1202 may be provided from a ground control terminal 30, and stored in orbit state storage 410. In an embodiment, the Ground GEOP State Information 1202 is uploaded to the satellite 102 via an RF communication link. The Ground GEOP State Information 1202 may be uploaded to the satellite 102 on an occasional basis such as every few hours, once a day, etc. The Ground GEOP State Information 1202 may include, for example, the expected orbits of the GPS satellites.

The orbit determination unit 218 determines the timestamped ephemeris data based on the GPS data from GPS receiver 1204 and the Ground GEOP State Information 1202. The timestamped ephemeris data may be provided continuously on a real-time basis. In one embodiment, the timestamped ephemeris data includes the spacecraft position in ECEF coordinates. In one embodiment, the orbit determination unit 218 improves the accuracy of the raw data from the onboard GPS receiver 1204 by, for example, factoring in the expected location of the GPS satellite that provided the GPS location data. For example, based on the expected location of the GPS satellite and the present location of the satellite 102 a correction factor may be derived to account for the time lag to transmit the GPS location data (based on the distance between the GPS satellite and the satellite 102).

Figure 13:
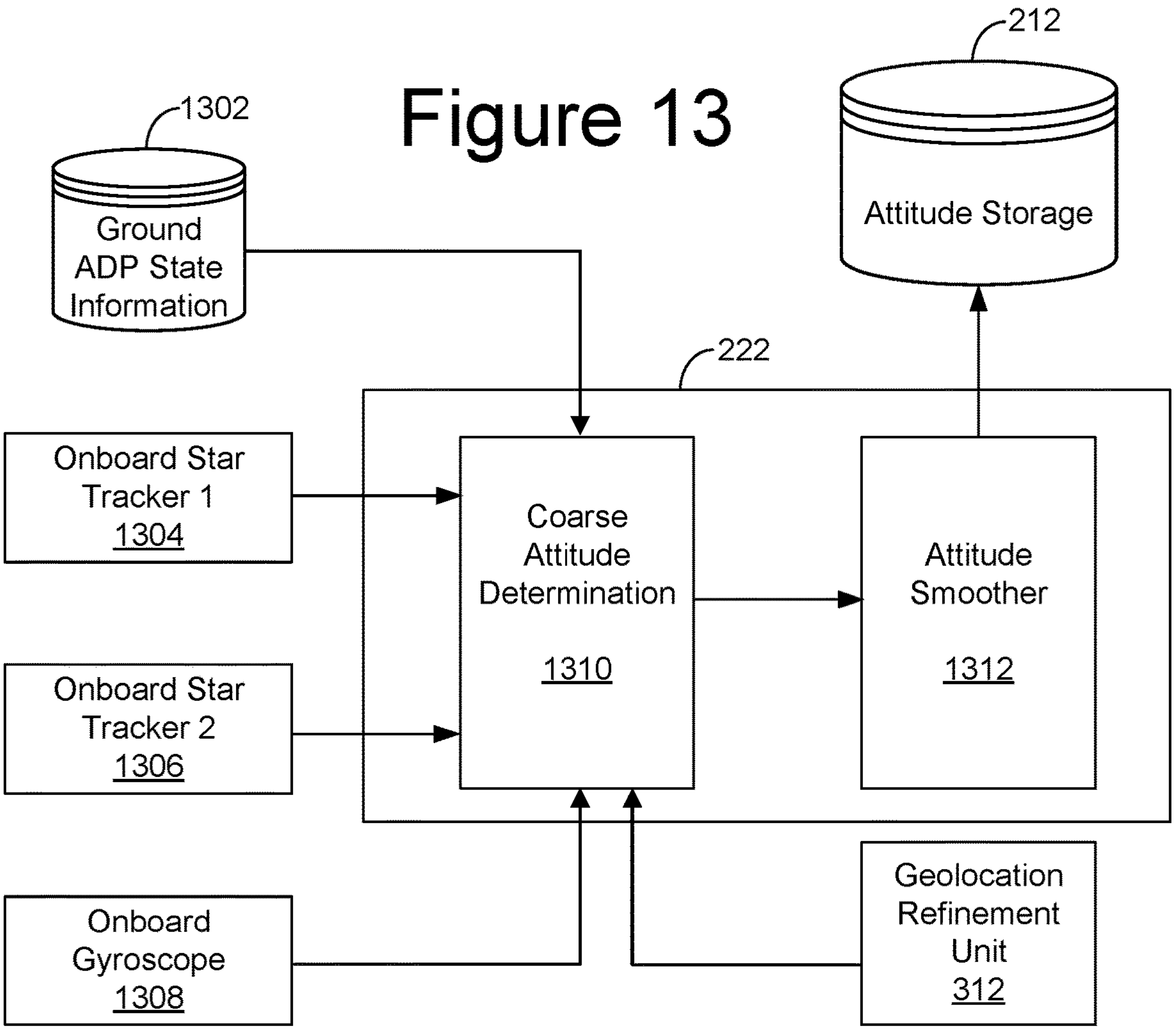
FIG. 13 is a diagram depicting further details of one embodiment of components for determining timestamped attitude data.

FIG. 13 is a diagram depicting further details of one embodiment of components for determining timestamped attitude data. The Ground ADP State Information 1302 is one embodiment of attitude state information. The Ground ADP State Information 1302 may be provided from a ground control terminal 30 and stored in attitude state storage 420. In one embodiment, the ADP State Information 1302 contains state information about the orientation of the image sensor(s) 104 with respect to the body of the spacecraft 102. Moreover, the orientation of the image sensor(s) 104 with respect to the body of the spacecraft 102 may change based on factors such as temperature. In one embodiment, the orientation of the image sensor(s) 104 with respect to the body of the spacecraft 102 is included in the ADP State Information 1302.

In this example, there are two star trackers (Onboard Star Tracker 1 1304 and Onboard Star Tracker 2 1306). The star trackers may determine the orientation of the spacecraft 102 with respect to certain stars. The star trackers may, for example, form an image a star pattern (e.g., constellation of stars) and compare the image with stored star maps. Therefore, the star trackers are able to assist with attitude determination by providing data on which way the spaceship 102 is oriented. In one embodiment, the star trackers output time-tagged star centroids.

The onboard gyroscope 1308 contains one or more gyroscopes. For example, the onboard gyroscope 1308 may contain multiple Hemispherical Resonator Gyros (HRG). The onboard gyroscope 1308 may also contain one or more accelerometers. In one embodiment, the onboard gyroscope 1308 outputs time-tagged integrated angles from multiple HRGs.

The attitude determination unit 222 includes a coarse attitude determination unit 1310 and an attitude smoother 1312. The attitude smoother 1312 is optional. The coarse attitude determination unit 1310 makes an initial estimation of the attitude based on one or more of: the Ground ADP State Information 1302, data from Onboard Star Tracker 1 1304, data from Onboard Star Tracker 2 1306, and onboard gyroscope 1308. The coarse attitude determination unit 1310 may also input corrected attitude filter parameters from the geolocation refinement unit 312. In an embodiment, the coarse attitude determination unit 1310 outputs timestamped body frame attitude data, which indicates the attitude of the spacecraft 102. The coarse attitude determination unit 1310 may optionally input refined attitude filter parameters from the geolocation refinement unit 310, as discussed above. The attitude smoother 1312 smooths the coarse attitude data from the coarse attitude determination unit 1310. The smoothed attitude data is stored in attitude storage 224.

Figure 14:
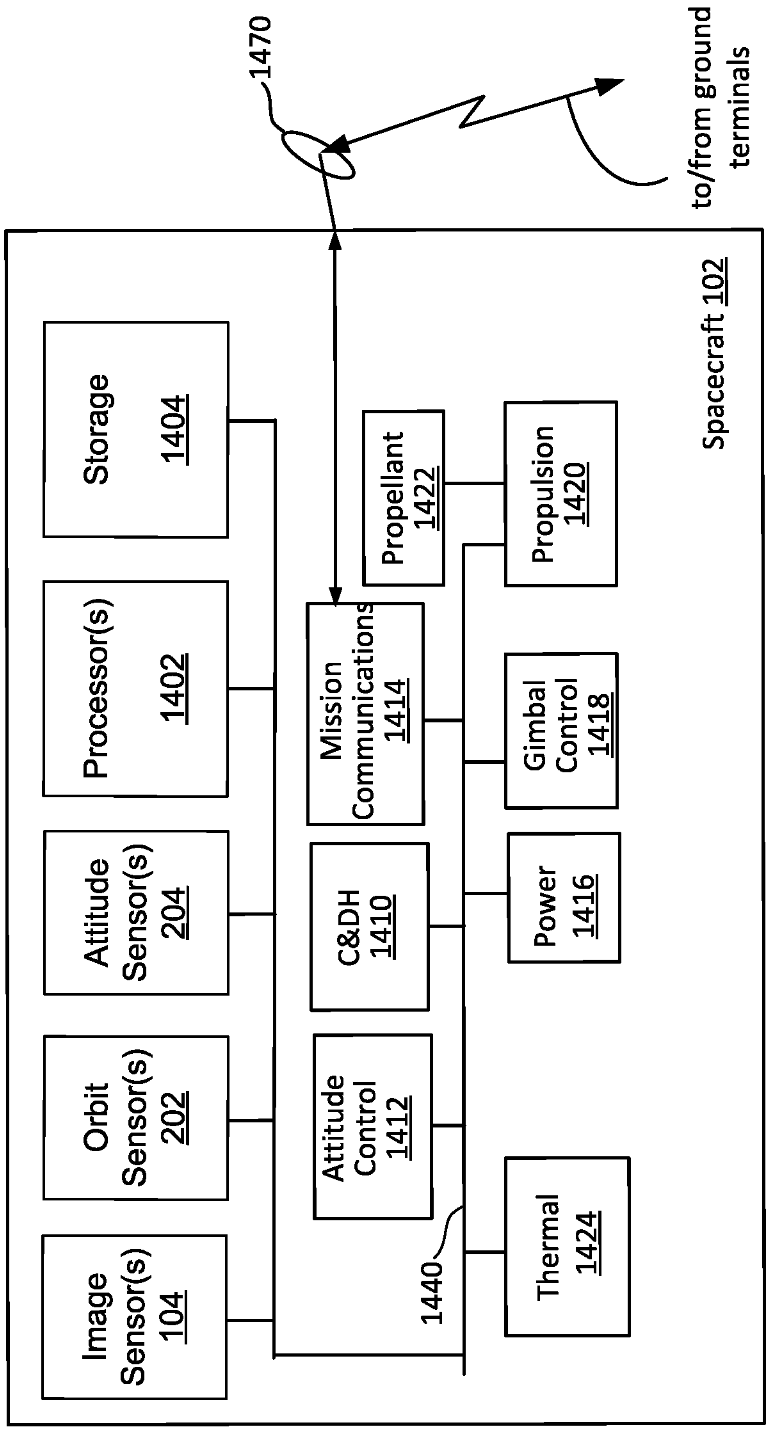
FIG. 14 is a block diagram of one embodiment of spacecraft, which in one example is a satellite.

FIG. 14 is a block diagram of one embodiment of spacecraft 102, which in one example (as discussed above) is a satellite. In one embodiment, spacecraft 102 includes image sensor(s) 104, orbit sensor(s) 202, attitude sensor(s) 204, one or more processors 1402 and processor readable storage 1404. The spacecraft 102 also includes a number of different functional sub-systems or modules, some examples of which are shown. Each of the functional sub-systems typically include electrical systems, as well as mechanical components (e.g., servos, actuators, motors) controlled by the electrical systems. These include a command and data handling sub-system (C&DH) 1410, attitude control systems 1412, mission communication systems 1414, power subsystems 1416, gimbal control electronics 1418 that may include a solar array drive assembly and an antenna reflector drive assembly, a propulsion subsystem 1420 (e.g., thrusters), propellant storage 1422 to fuel some embodiments of propulsion subsystem 1420, and thermal control subsystem 1424, all of which are connected by an internal communication network 1440, which can be an electrical bus (a "flight harness") or other means for electronic, optical or RF communication when spacecraft is in operation.

Also represented is an antenna 1470, that is one of one or more antennae used by the mission communication systems 1414 for exchanging communications for operating of the spacecraft with ground terminals. Other equipment can also be included. The gimbal control electronics 1418 may be used in the APS to control the position of the antenna reflectors 1470.

The command and data handling module 1410 includes any processing unit or units for handling includes command control functions for spacecraft 102, such as for attitude control functionality and orbit control functionality. The attitude control systems 1412 can include devices including torque rods, wheel drive electronics, and control momentum gyro control electronics, for example, that are used to monitor and control the attitude of the spacecraft. Mission communication systems 1414 includes wireless communication and processing equipment for receiving telemetry data/commands, other commands from the ground control terminal 30 to the spacecraft and ranging to operate the spacecraft. In an embodiment, mission communication systems 1414 transmits images and geolocation data to ground control terminals 30.

Processing capability within the command and data handling module 1410 is used to control and operate spacecraft 102. An operator on the ground can control spacecraft 102 by sending commands via ground control terminal 30 to mission communication systems 1414 to be executed by processors within command and data handling module 1410. Power subsystems 1416 can include one or more solar panels and charge storage (e.g., one or more batteries) used to provide power to spacecraft 102. Propulsion subsystem 1420 (e.g., thrusters) is used for changing the position or orientation of spacecraft 102 while in space to move into orbit, to change orbit or to move to a different location in space. The gimbal control electronics 1418 can be used to move and align the antennae, solar panels, and other external extensions of the spacecraft 102.

The components in the spacecraft 102 may be referred to as electronic circuits. The electronic circuits may comprise hardware and/or software. The electronic circuits may be implemented at least in part by executing processor executable instructions on a processer (e.g., a microprocessor). The electronic circuits may be implemented at least in part by an Application Specific Integrated Circuit (ASIC), FPGA, etc.

In one embodiment, the processor 1402 executes instructions that are stored in storage 1404 in order to perform functionality described herein including, but not limited to, processes 500, 600, 750, 800, 900, 1000, and/or 1100. In one embodiment, the processor 1402 executes instructions that are stored in storage 1404 in order to perform functionality described herein including, but not limited to, image element selector 214, orbit determination unit 218, attitude determination unit 222, and/or geolocation refinement unit 310.

In one embodiment, the storage 1404 is used for one or more of image storage 212, ephemeris storage 220, attitude storage 224, and/or geolocation storage. The storage 1404 is non-transitory processor readable storage. Examples of non-transitory processor readable storage include RAM (e.g., DRAM, SRAM), ROM, flash memory, MRAM, other solid state memories, disk drives, etc.).

One embodiment includes a method for on-board spacecraft image geolocation. The method comprises sensing timestamped images with an image sensor of a spacecraft, collecting orbit position data using one or more sensors of the spacecraft, and collecting attitude data using one or more sensors of the spacecraft. The method also comprises generating, by one or more electronic circuits onboard the spacecraft, timestamped ephemeris data for the spacecraft based on the orbit position data. The method also comprises generating, by the one or more electronic circuits onboard the spacecraft, timestamped attitude data for the spacecraft based on the collected attitude data. The method also comprises determining, by the one or more electronic circuits onboard the spacecraft, timestamped geolocation data for elements in the respective images based on the timestamped ephemeris data and the timestamped attitude data.

In one embodiment, the method further comprises further comprises refining, by the one or more electronic circuits onboard the spacecraft, the geolocation data for the elements in the respective images based on a digital construct; correcting, by the one or more electronic circuits onboard the spacecraft, attitude filter parameters based on the refined geolocation data for the elements in the respective images;

and generating, by the one or more electronic circuits onboard the spacecraft, additional timestamped attitude data for the spacecraft based on the collected attitude data after correcting the attitude filter parameters. The method further comprises determining, by the one or more electronic circuits onboard the spacecraft, additional timestamped geolocation data for elements in the respective images based on the timestamped ephemeris data and the additional timestamped attitude data.

In one embodiment, the method further comprises refining, by the one or more electronic circuits onboard the spacecraft, the geolocation data for the elements in the respective images based on a digital construct; correcting, by the one or more electronic circuits onboard the spacecraft, orbit filter parameters based on the refined geolocation data for the elements in the respective images; and generating, by the one or more electronic circuits onboard the spacecraft, additional timestamped ephemeris data for the spacecraft based on the collected orbit position data after correcting the orbit filter parameters. The method further comprises determining, by the one or more electronic circuits onboard the spacecraft, additional timestamped geolocation data for elements in the respective images based on the additional timestamped ephemeris data and the timestamped attitude data.

In one embodiment, generating, by the one or more electronic circuits onboard the spacecraft, the timestamped attitude data for the spacecraft based on the collected attitude data further comprises: accessing attitude state information; replacing a current estimate of one or more states in an attitude state vector based on the attitude state information, and generating additional timestamped attitude data based on the collected attitude data after replacing the current estimate of the one or more states in the attitude state vector. The method further comprises determining, by the one or more electronic circuits onboard the spacecraft, additional timestamped geolocation data for elements in the respective images based on the timestamped ephemeris data and the additional timestamped attitude data.

In one embodiment, the method further comprises receiving the attitude state information from a ground station by the one or more electronic circuits onboard the spacecraft. The attitude state information is determined based on control point information not available at the spacecraft. In one embodiment, the control point information includes GCPs. In one embodiment, the control point information includes SCPs.

In one embodiment, generating, by the one or more electronic circuits onboard the spacecraft, the timestamped attitude data for the spacecraft based on the collected attitude data further comprises; accessing attitude state information from a ground station; replacing at least a portion of a current covariance matrix of an estimated attitude state vector based on the attitude state information; generating additional timestamped attitude data based on the collected attitude data after replacing at least the portion of the current covariance matrix of the estimated attitude state vector; and determining additional timestamped geolocation data for elements in the respective images based on the timestamped ephemeris data and the additional timestamped attitude data.

In one embodiment, generating, by the one or more electronic circuits onboard the spacecraft, the timestamped ephemeris data for the spacecraft based on the orbit position data further comprises: accessing orbit position state information; replacing a one or more states in a current estimate of an orbit state vector based on the orbit position state information; generating additional timestamped ephemeris data based on the collected orbit position data after replacing the one or more states in the current estimate of the orbit state vector; and determining additional timestamped geolocation data for elements in the respective images based on the additional timestamped ephemeris data and the timestamped attitude data.

In one embodiment, the method further comprises receiving the orbit state information from a ground station by the one or more electronic circuits onboard the spacecraft. The attitude state information is determined based on control point information not available at the spacecraft. In one embodiment, the control point information includes GCPs. In one embodiment, the control point information includes SCPs.

In one embodiment, wherein generating, by the one or more electronic circuits onboard the spacecraft, the timestamped ephemeris data for the spacecraft based on the orbit position data further comprises: accessing orbit position state information from a ground station; replacing at least a portion of a current covariance matrix of an estimate of an orbit state vector based on the orbit position state information, generating additional timestamped ephemeris data based on the collected orbit position data after replacing at least the portion of the current covariance matrix of the estimate of the orbit state vector; and determining additional timestamped geolocation data for elements in the respective images based on the additional timestamped ephemeris data and the timestamped attitude data.

In one embodiment, determining, by the one or more electronic circuits onboard the spacecraft, timestamped geolocation data for an element in a particular image based on the timestamped ephemeris data and the timestamped attitude data comprises mapping, by the one or more electronic circuits onboard the spacecraft, the element in the particular image to a region of the image sensor; forming, by the one or more electronic circuits onboard the spacecraft, a ray from the region of the image sensor to a point on the Earth based on the timestamped attitude data and the timestamped ephemeris data; projecting, by the one or more electronic circuits onboard the spacecraft, a digital elevation model into the Earth; and determining, by the one or more electronic circuits onboard the spacecraft, where the ray intersect the digital elevation model.

In one embodiment, the method further comprises providing, by the one or more electronic circuits onboard the spacecraft, the timestamped geolocation data and the respective images from the spacecraft to a ground station.

On embodiment includes a spacecraft, comprising an image sensor configured to provide timestamped images; one or more orbit sensors configured to provide orbit position data, one or more attitude sensors configured to provide attitude data, and one or more electronic circuits in communication with the image sensor, the one or more orbit sensors, and the one or more attitude sensors. The one or more electronic circuits are configured to generate timestamped ephemeris data for the spacecraft based on the orbit position data; generate timestamped attitude data for the spacecraft based on the attitude data; and determine timestamped geolocation information for target elements in the respective images based on the timestamped ephemeris data and the timestamped attitude data.

On embodiment includes a spacecraft imaging system, comprising an image sensor configured to provide timestamped images taken from a spacecraft; one or more orbit sensors configured to provide orbit position data for the spacecraft, one or more attitude sensors configured to provide attitude data for the spacecraft; an onboard communication link that resides on the spacecraft; one or more processors on the spacecraft, wherein the one or more processors are in communication with the image sensor, the one or more orbit sensors, and the one or more attitude sensors by way of the onboard communication link; and one or more processor readable storage devices on the spacecraft, wherein the one or more processor readable storage devices are in communication with the one or more processors. The one or more processor readable storage devices store code for programming the one or more processors to receive the orbit position data from the one or more orbit sensors via the onboard communication link; receive the attitude data from the one or more attitude sensors via the onboard communication link; generate timestamped ephemeris data for the spacecraft based on the orbit position data; generate timestamped attitude data for the spacecraft based on the attitude data; select a target element in respective images from the image sensor; and determine timestamped geolocation data for the target elements in the respective images based on the timestamped ephemeris data and the timestamped attitude data.

Examples of non-transitory processor readable storage mediums include RAM (e.g., DRAM, SRAM), ROM, flash memory, MRAM, other solid state memories, disk drives, etc.)

One embodiment includes an apparatus comprising one or more processors and one or more processor readable storage devices in communication with the one or more processors. The one or more processor readable storage devices store code for programming the one or more processors to:

For purposes of this document, it should be noted that the dimensions of the various features depicted in the figures may not necessarily be drawn to scale.

For purposes of this document, reference in the specification to "an embodiment," "one embodiment," "some embodiments." or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A method for on-board spacecraft image geolocation, the method comprising:

sensing timestamped images with an image sensor of a spacecraft;

collecting orbit position data using one or more sensors of the spacecraft;

collecting attitude data using one or more sensors of the spacecraft;

generating, by one or more electronic circuits onboard the spacecraft, timestamped ephemeris data for the spacecraft based on the orbit position data;

generating, by the one or more electronic circuits onboard the spacecraft, using a Kalman filter, timestamped attitude data for the spacecraft based on the collected attitude data;

projecting, by the one or more electronic circuits onboard the spacecraft, a pixel ray from the image sensor to a point on the Earth, based on the timestamped attitude data and the timestamped ephemeris data, the pixel ray specific to a target pixel(s) of a target element in at least one of the timestamped images;

determining, by the one or more electronic circuits onboard the spacecraft, an intersection between the pixel ray and a digital elevation model;

determining, by the one or more electronic circuits onboard the spacecraft, in real-time, timestamped geolocation data for the target pixel(s) in the at least one timestamped image, based on the intersection;

refining, by the one or more electronic circuits onboard the spacecraft, the geolocation data for the target pixel(s) in the at least one timestamped image, based on correspondence between the at least one timestamped image and a three-dimensional digital construct of at least a portion of the Earth;

correcting, by the one or more electronic circuits onboard the spacecraft, attitude filter parameters of the Kalman filter, based on the refined geolocation data for the target pixel(s) in the at least one timestamped image;

generating, by the one or more electronic circuits onboard the spacecraft, using the Kalman filter with the corrected attitude filter parameters, additional timestamped attitude data for the spacecraft based on the collected attitude data; and determining, by the one or more electronic circuits onboard the spacecraft, additional timestamped geolocation data for ones of the target pixel(s) based on the additional timestamped attitude data.

2. The method of claim 1, further comprising:

correcting, by the one or more electronic circuits onboard the spacecraft, orbit filter parameters based on the refined geolocation data for the target pixel(s);

generating, by the one or more electronic circuits onboard the spacecraft, additional timestamped ephemeris data for the spacecraft based on the collected orbit position data after correcting the orbit filter parameters; and determining, by the one or more electronic circuits onboard the spacecraft, additional timestamped geolocation data for target pixel(s) based on the additional timestamped ephemeris data and the timestamped attitude data and/or the additional timestamped attitude data.

3. The method of claim 1, wherein correcting the attitude filter parameters includes:
accessing attitude state information; and
replacing a current estimate of one or more states in an attitude state vector of a covariance matrix of the Kalman filter based on the attitude state information.
4. The method of claim 3, further comprising:
receiving the attitude state information from a ground station by the one or more electronic circuits onboard the spacecraft, wherein the attitude state information is determined based on control point information not available at the spacecraft.
5. The method of claim 1, wherein correcting the attitude filter parameters includes:
accessing attitude state information from a ground station; and
replacing at least a portion of a current covariance matrix of an estimated attitude state vector of the Kalman filter based on the attitude state information.
6. The method of claim 1, wherein generating, by the one or more electronic circuits onboard the spacecraft, the timestamped ephemeris data for the spacecraft based on the orbit position data further comprises:
accessing orbit position state information;
replacing a current estimate of one or more states in an orbit state vector based on the orbit position state information;
generating additional timestamped ephemeris data based on the collected orbit position data after replacing the current estimate of the one or more states in the orbit states vector; and
determining by the one or more electronic circuits onboard the spacecraft, additional timestamped geolocation data for target pixel(s) based on the additional timestamped ephemeris data and the timestamped attitude data and/or the additional timestamped attitude data.
7. The method of claim 6, further comprising:
receiving, by the one or more electronic circuits onboard the spacecraft, the orbit position state information at the spacecraft from a ground station, wherein the orbit state information is determined based on control point information not available at the spacecraft.
8. The method of claim 1, wherein generating, by the one or more electronic circuits onboard the spacecraft, the timestamped ephemeris data for the spacecraft based on the orbit position data further comprises:
accessing orbit position state information from a ground station;
replacing at least a portion of a current covariance matrix of an estimate of an orbit state vector based on the orbit position state information;
generating additional timestamped ephemeris data based on the collected orbit position data after replacing at least the portion of the current covariance matrix of the estimate of the orbit state vector; and
determining, by the one or more electronic circuits onboard the spacecraft, additional timestamped geolocation data for target pixel(s) based on the additional timestamped ephemeris data and the timestamped attitude data and/or the additional timestamped attitude data.
9. The method of claim 1, further comprising:
providing, by the one or more electronic circuits onboard the spacecraft, the timestamped geolocation data and the respective images from the spacecraft to a ground station.
10. A spacecraft, comprising:
an image sensor configured to provide timestamped images;
one or more orbit sensors configured to provide orbit position data;
one or more attitude sensors configured to provide attitude data; and
one or more electronic circuits in communication with the image sensor, the one or more orbit sensors, and the one or more attitude sensors, wherein the one or more electronic circuits are configured to:
generate timestamped ephemeris data for the spacecraft based on the orbit position data;
generate, using a Kalman filter, timestamped attitude data for the spacecraft based on the attitude data;
project a pixel ray from the image sensor to a point on the Earth, based on the timestamped attitude data and the timestamped ephemeris data, the pixel ray specific to a target pixel(s) of a target element in at least one of the timestamped images;
determine an intersection between the pixel ray and a digital elevation model;
determine timestamped geolocation information for target pixel(s) in the at least one timestamped image, based on the intersection;
refine the timestamped geolocation information for the target pixel(s) of the at least one timestamped image, based on correspondence between the at least one timestamped image and a three-dimensional digital construct of at least a portion of the Earth;
correct attitude filter parameters of the Kalman filter based on the refined geolocation data;
generate, using the Kalman filter with the corrected attitude filter parameters, additional timestamped attitude data for the spacecraft based on the provided attitude data; and
determine additional timestamped geolocation information for ones of the target pixel(s) based on the additional timestamped attitude data.
11. The spacecraft of claim 10, wherein the one or more electronic circuits are further configured to:
refine the timestamped geolocation information based on a digital construct to generate secondary geolocation data;
correct orbit filter parameters based on the secondary geolocation data;
generate additional timestamped ephemeris data for the spacecraft based on the orbit position data after correcting the orbit filter parameters; and
determine additional timestamped geolocation information for target pixel(s) in the respective images based on the additional timestamped ephemeris data and the timestamped attitude data and/or the additional timestamped attitude data.
12. The spacecraft of claim 10, wherein the one or more electronic circuits are further configured, in correcting the attitude filter parameters, to:
receive attitude state information at the spacecraft from a ground station; and
replace a current estimate of one or more states in an attitude state vector for the Kalman filter based on the attitude state information.
13. The spacecraft of claim 10, wherein the one or more electronic circuits are further configured, in correcting the attitude filter parameters, to:

receive attitude state information at the spacecraft from a ground station; and replace at least a portion of a current covariance matrix of a current estimate of an attitude state vector of the Kalman filter based on the attitude state information.

14. The spacecraft of claim 10, wherein the one or more electronic circuits are further configured to:

receive orbit state information at the spacecraft from a ground station;

replace a current estimate of one or more states in an orbit state vector based on the orbit state information;

generate additional timestamped ephemeris data for the spacecraft based on the orbit position data from the one or more orbit sensors after replacing the current estimate of the one or more states in the orbit state vector; and determine additional timestamped geolocation information for target pixel(s) in the respective images based on the additional timestamped ephemeris data and the timestamped attitude data and/or the additional timestamped attitude data.

15. The spacecraft of claim 10, wherein the one or more electronic circuits are configured, in correcting the attitude filter parameters, to:

receive orbit state information at the spacecraft from a ground station; and replace at least a portion of a current covariance matrix of a current estimate of an orbit state vector of the Kalman filter based on the orbit state information.

16. The spacecraft of claim 10, wherein the one or more electronic circuits are further configured to:

provide the timestamped geolocation information for the target pixel(s) in respective images along with the respective images from the spacecraft to a ground station.

* * * * *